United States Patent
Dunlap

(10) Patent No.: US 8,412,048 B2
(45) Date of Patent: Apr. 2, 2013

(54) SURFACE AND SUB-SURFACE WAVE FRONT MANAGEMENT

(75) Inventor: Philip Stephen Dunlap, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 759 days.

(21) Appl. No.: 12/491,833

(22) Filed: Jun. 25, 2009

(65) Prior Publication Data

US 2010/0329687 A1 Dec. 30, 2010

(51) Int. Cl.
*H04B 10/00* (2006.01)

(52) U.S. Cl. ........ 398/104; 398/135; 398/136; 398/130; 398/131; 398/128; 398/129; 398/25; 398/140; 367/131; 367/128; 367/134; 367/133

(58) Field of Classification Search ............... 398/104, 398/105, 25, 26, 27, 140, 135, 136, 137, 398/131, 122, 129, 130, 147, 158, 159, 118, 398/119, 120, 121, 123, 124, 125, 128, 138, 398/139, 164, 153, 156, 33; 367/131, 128, 367/134, 133
See application file for complete search history.

(56) References Cited

U.S. PATENT DOCUMENTS

| 4,986,655 A | 1/1991 | Sweeney et al. | |
|---|---|---|---|
| 5,038,406 A * | 8/1991 | Titterton et al. | ............... 398/125 |
| 5,181,135 A | 1/1993 | Keeler et al. | |
| 5,966,229 A | 10/1999 | Dodley et al. | |
| 2003/0067657 A1 * | 4/2003 | Dimmler et al. | ............... 359/159 |
| 2007/0183783 A1 * | 8/2007 | Lam | ............................ 398/123 |

FOREIGN PATENT DOCUMENTS

| AU | 762076 B2 | 6/2003 |
|---|---|---|
| JP | 11234209 | 8/1999 |

OTHER PUBLICATIONS

Chew et al., "Benefits of a single photon wavefront sensor", New Zealand, retrieved Apr. 23, 2009, pp. 1-5 http://www.cs.otago.ac.nz/ipapers/16.pdf.

Smart, "Underwater Optical Communications Systems Part 1: Variability of Water Optical Parameters", Military Communications Conference, 2005, IEEE Atlantic City NJ, pp. 1-7.

Giles et al., "Underwater Optical Communications Systems Part 1: Variability of Water Optical Parameters", Military Communications Conference, 2005, IEEE Atlantic City NJ, pp. 1-6.

* cited by examiner

*Primary Examiner* — Hanh Phan
(74) *Attorney, Agent, or Firm* — Yee & Associates, P.C.

(57) ABSTRACT

A method and apparatus are present for managing a transmission of photons. The number of parameters for transmitting the photons as a beam in a liquid are identified using a number of characteristics of the liquid to form a number of selected parameters. The photons are transmitted in the liquid as the beam to a target using the number of selected parameters to form the transmission of the photons.

49 Claims, 12 Drawing Sheets

SURFACE AND SUB-SURFACE WAVE FRONT MANAGEMENT

BACKGROUND INFORMATION

1. Field

The present disclosure relates generally to the transmission of photons and, in particular, to a method and apparatus for transmitting photons from between two objects. Still more particularly, the present disclosure relates to a method and apparatus for transmitting optical signals between two objects in an environment.

2. Background

Lasers are used for a number of different applications. A laser is a device that emits photons through a process of stimulated emission. A laser light is usually spatially coherent. In other words, the light emitted by a laser may be a narrow, low divergence beam or may be converted into this type of beam through the use of optical components, such as lenses.

Lasers may be used in a number of different applications. For example, lasers may be used to process materials. For example, lasers may be used in cutting, welding, cleaning, and other suitable operations. Further, lasers also may be used in target designation, ranging, and communications.

Although lasers generate a beam that can be transmitted over long distances, the environment through which a laser beam travels may reduce the distance and/or effectiveness of the laser beam. More specifically, photons in the laser beam may be diffused and/or scattered when propagating through liquids, solids, or gas. For example, propagation of a laser beam under water may result in greater scattering and diffusion as compared to transmitting the same laser beam through air.

Many of the wavelengths used in laser beams may propagate through water. These laser beams may be scattered and/or absorbed in water. Some wavelengths for laser beams may propagate more readily than other wavelengths. In another example, the transmission of a laser beam through ice may have increased diffusion and scattering as compared to transmission of the laser beam through air.

To compensate for photonic losses or weak signals and/or signatures, some currently available solutions involve using large apertures to transmit or collect more light. These solutions may improve communications, surveillance, and/or have other effects. However, these types of solutions are physically limited, and may only provide limited functionality at short ranges, shallow depths, and slow transmission rates.

With respect to surveillance and sensor functions for identifying target ranges, other types of systems have been used in place of lasers. For example, active sonar is currently used instead of lasers to obtain ranges of objects that may be located in the water. In a similar fashion, acoustic sonar also has been used for target illumination for objects in the water.

Therefore, it would be advantageous to have a method and apparatus that takes into account one or more of the issues discussed above, as well as possibly other issues.

SUMMARY

In one advantageous embodiment, a method is present for managing a transmission of photons. The number of parameters for transmitting the photons as a beam in a liquid are identified using a number of characteristics of the liquid to form a number of selected parameters. The photons are transmitted in the liquid as the beam to a target using the number of selected parameters to form the transmission of the photons.

In another advantageous embodiment, a method is present for managing a transmission of optical signals. A first number of characteristics for a first medium are identified. A second number of characteristics for a second medium are identified. A third number of characteristics for a transition between the first medium and the second medium are identified. A location of a target is identified in the second medium. An optical signal is generated within the first medium using the first number of characteristics, the second number of characteristics, the third number of characteristics, and the location of the target. The optical signal propagates through the first medium, the transition, and the second medium reaching the target with a number of desired properties at the target.

In yet another advantageous embodiment, an apparatus comprises a photon generation system and a wave front management system. The photon generation system is configured to generate photons. The wave front management system is configured to control a number of properties of the photons generated by the photon generation system. The photon generation system is associated with the wave front management system.

In still yet another advantageous embodiment, a method is present for managing a transmission of photons. A number of parameters are identified for transmitting the photons as a beam in a medium using a number of characteristics of the medium to form a number of selected parameters. The photons are transmitted in the medium as the beam to a target using the number of selected parameters.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
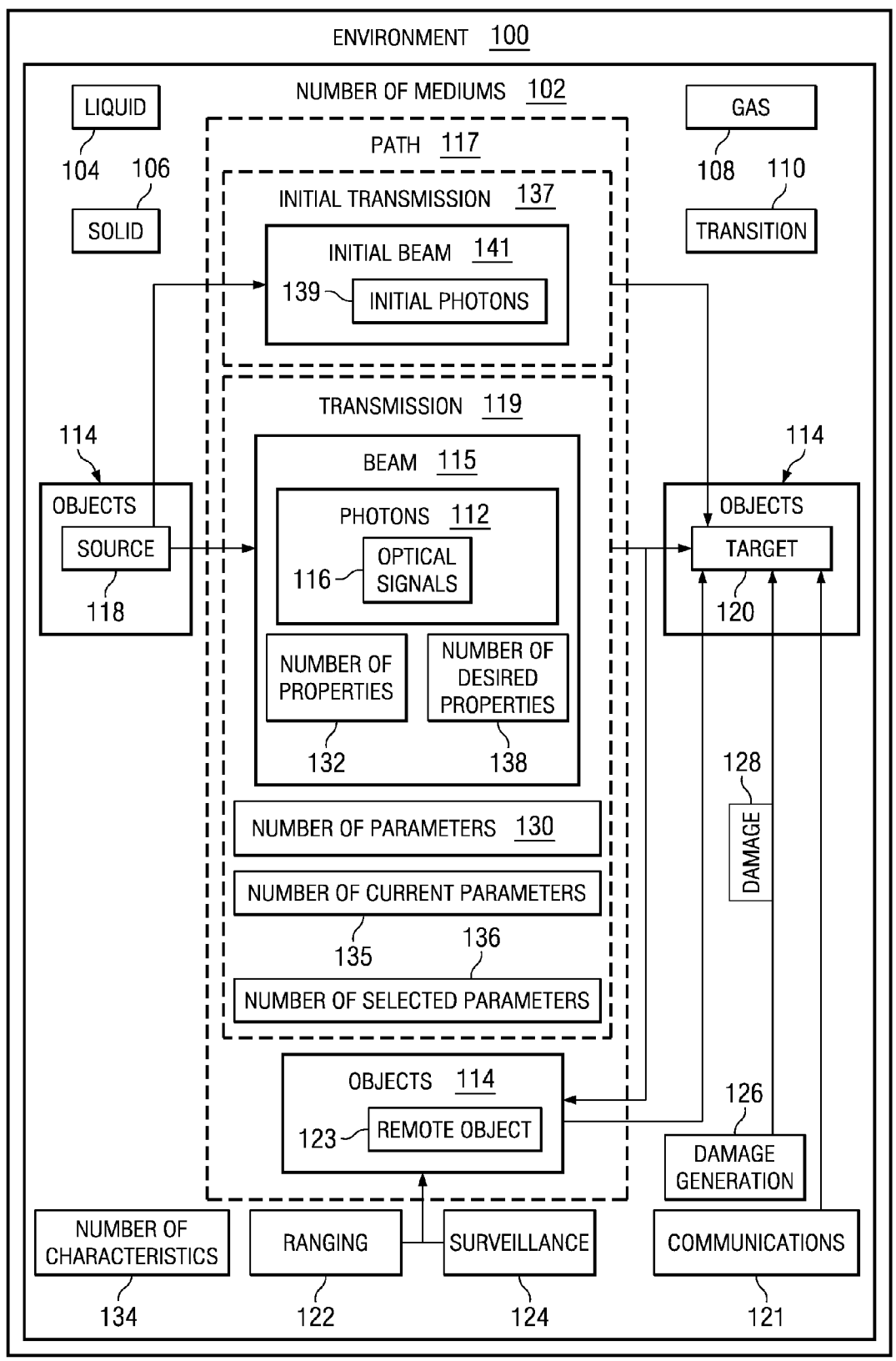
FIG. 1 is a diagram of an environment in which photons are transmitted in accordance with an advantageous embodiment.

With reference now to the figures and, in particular, with reference to FIG. 1, a diagram of an environment in which photons are transmitted is depicted in accordance with an advantageous embodiment. In these illustrative examples, environment 100 includes number of mediums 102. Number of mediums 102 may include at least one of liquid 104, solid 106, and gas 108.

For example, without limitation, number of mediums 102 may include at least one of water, an ocean, an atmosphere of a celestial body, such as a planet or a star, outer space, a transparent solid, a semi-opaque solid, debris, aquatic life, ice, glass, sand, and/or some other suitable medium. In these examples, an atmosphere is a gaseous atmosphere, such as Earth's atmosphere, which is also referred to as air.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

When two or more mediums are present in number of mediums 102 within environment 100, transition 110 is present between the two mediums in these illustrative examples. Transition 110 may comprise, for example, without limitation, a surface, a wave, an edge, a boundary, and/or some other suitable type of transition between two mediums within number of mediums 102. For example, transition 110 may be waves between water and the Earth's atmosphere. In another example, transition 110 may be a surface between water and ice.

In yet another example, transition 110 may be the boundary between a layer of liquid and a layer of gas within the atmosphere of a celestial body. Without limitation, in another example, number of mediums 102 and number of transitions 110 may include a layer of liquid hydrogen, a layer of gaseous helium and hydrogen atmosphere, a layer of vaporous aerosols, water vapor, cloud-suspended ice, and ammonia crystals, and/or vacuum outer-space. Some of the layers described above for number of mediums 102 and number of transitions 110 may be found in the atmosphere of a plant, such as Jupiter.

In these depicted examples, photons 112 take the form of optical signals 116. Photons 112 are transmitted between objects 114 in one or more beams. For example, photons are transmitted in the form of beam 115 in these illustrative examples. Beam 115 links objects 114. In these depicted examples, objects 114 include source 118 and target 120. Source 118 generates photons 112 in these examples. Target 120 is an object within objects 114 that receives photons 112. In this manner, source 118 and target 120 are linked by beam 115. In these illustrative examples, beam 115 may be photons travelling with as little divergence as possible from source 118 to target 120.

In these illustrative examples, beam 115 travels along path 117 from source 118 to target 120. This propagation of photons 112 forms transmission 119 in these illustrative examples. Photons 112 may be used for at least one of communications 121, ranging 122, surveillance 124, and damage generation 126. When used for communications 121, information such as, for example, without limitation, data, commands, programs, messages, and other information may be included in optical signals 116 formed by photons 112. Damage generation 126 may cause damage 128 to target 120.

Ranging 122 may be used to identify a distance between source 118 and remote object 123. In these examples, remote object 123 may be an object within objects 114. Ranging 122 and surveillance 124 may be used to detect and/or identify remote object 123 for use in other operations.

As one illustrative example, in ranging 122 and surveillance 124, source 118 sends transmission 119 of photons 112 in beam 115. Transmission 119 of photons 112 propagates towards remote object 123 along path 117. Photons 112 are reflected off of remote object 123. Transmission 119 of photons 112 then continues along path 117 and propagates towards target 120. In this illustrative example, target 120 may be, for example, a sensor system. In this manner, remote object 123 may be detected and/or identified in ranging 122 and surveillance 124. Further, a distance from source 118 to remote object 123 may also be identified through transmission 119 of photons 112.

In this illustrative example, for ranging 122 and surveillance 124, source 118 and target 120 may be located on the same platform. In other advantageous embodiments, source 118 and target 120 may be located on separate platforms. The platform may be, for example, without limitation, a submarine, a ship, an aircraft, a land-based station, a subsurface object, or some other suitable platform.

In other advantageous embodiments, remote object 123 may be capable of communicating with source 118. For example, remote object 123 may send feedback to source 118 to aid transmission 119 of photons 112 reaching target 120. This feedback may include, for example, information about adjustments that may be made to beam 115 to transmit beam 115 to target 120 with as little divergence as possible.

In some advantageous embodiments, remote object 123 may monitor beam 115 at target 120 and send information about number of properties 132 to source 118. This information may be used by source 118 to send beam 115 in transmission 119 with number of desired properties 138. In these illustrative examples, remote object 123 and target 120 may be located on separate platforms. In other advantageous embodiments, remote object 123 and target 120 may be located on the same platform. Further, remote object 123 and target 120 may be part of the same object within objects 114.

In some advantageous embodiments, photons 112 in beam 115 may be controlled to provide surveillance 124 beyond line-of-sight capabilities. For example, the refractive and/or reflective properties of number of mediums 102 and remote object 123 may be used in controlling photons 112 in beam 115 to reflect off of remote object 123 in a manner that provides surveillance 124 beyond line-of-sight for remote object 123. In a similar manner, photons 112 in beam 115 may be controlled to provide damage generation 126 beyond line-of-sight capabilities. Damage generation 126 can include physical damage and/or temporary or permanent functional degradation.

Transmission 119 of photons 112 may be performed using number of parameters 130. In these illustrative examples, beam 115 has number of properties 132. In these illustrative examples, number of parameters 130 may be adjusted or selected to create number of desired properties 138 based on number of characteristics 134 for each medium within number of mediums 102.

One or more of the different advantageous embodiments may identify number of parameters 130 for transmitting photons 112 as beam 115 in liquid 104 within number of mediums 102. Number of parameters 130 is identified using number of characteristics 134 of liquid 104 within number of mediums 102 in these illustrative examples. Of course, number of characteristics 134 may be identified for other mediums within number of mediums 102.

The identification of number of characteristics 134 may be based on each medium within number of mediums 102 along path 117 from source 118 to target 120. In these illustrative examples, number of characteristics may be identified in response to initial transmission of initial photons 139 as initial beam 141 along path 117 from source 118 to target 120.

In the different advantageous embodiments, transmission 119 of photons 112 may be altered within a medium, such as liquid 104, using number of parameters 130. For example, number of current parameters 135 may be identified for at least one of photons 112 within beam and liquid 104. Transmission 119 may be altered by changing number of current parameters 135 to number of selected parameters 136 for at least one of photons 112 within beam 115 and liquid 104. In other words, altering transmission 119 may include, for example, altering photons 112 and/or liquid 104.

With number of selected parameters 136, beam may reach target 120 with number of desired properties 138. In these illustrative examples, photons in beam 115 may be transmitted in a pulsed or modulated manner, while being altered within the medium.

In some advantageous embodiments, number of characteristics 134 for number of mediums 102 may be changed along at least a portion of path 117 in number of mediums 102 for beam 115 using number of parameters 130.

The transmission of beam 115 along path 117 may provide desired values for number of desired properties 138. The selection of number of parameters 130 for the transmission of photons 112 in beam 115 also may take into account number of characteristics 134 that may occur at transition 110 between mediums in number of mediums 102. With the identification of number of characteristics 134 for more mediums through which photons 112 travel in beam 115 to target 120, the different advantageous embodiments may take into account these additional mediums in selecting number of selected parameters 136 to generate number of desired properties 138.

The illustration of environment 100 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional targets, in addition to target 120, may be present. In this example, source 118 may generate photons 112 for transmission to additional targets in addition to target 120. In yet other advantageous embodiments, number of mediums 102 may only comprise a single medium. In yet other advantageous embodiments, in addition to liquid 104, solid 106 and gas 108 may be present. For example, a vacuum may be present in space through which photons 112 may travel in beam 115 through liquid 104 into gas 108 and then into the vacuum to reach target 120.

Figure 2:
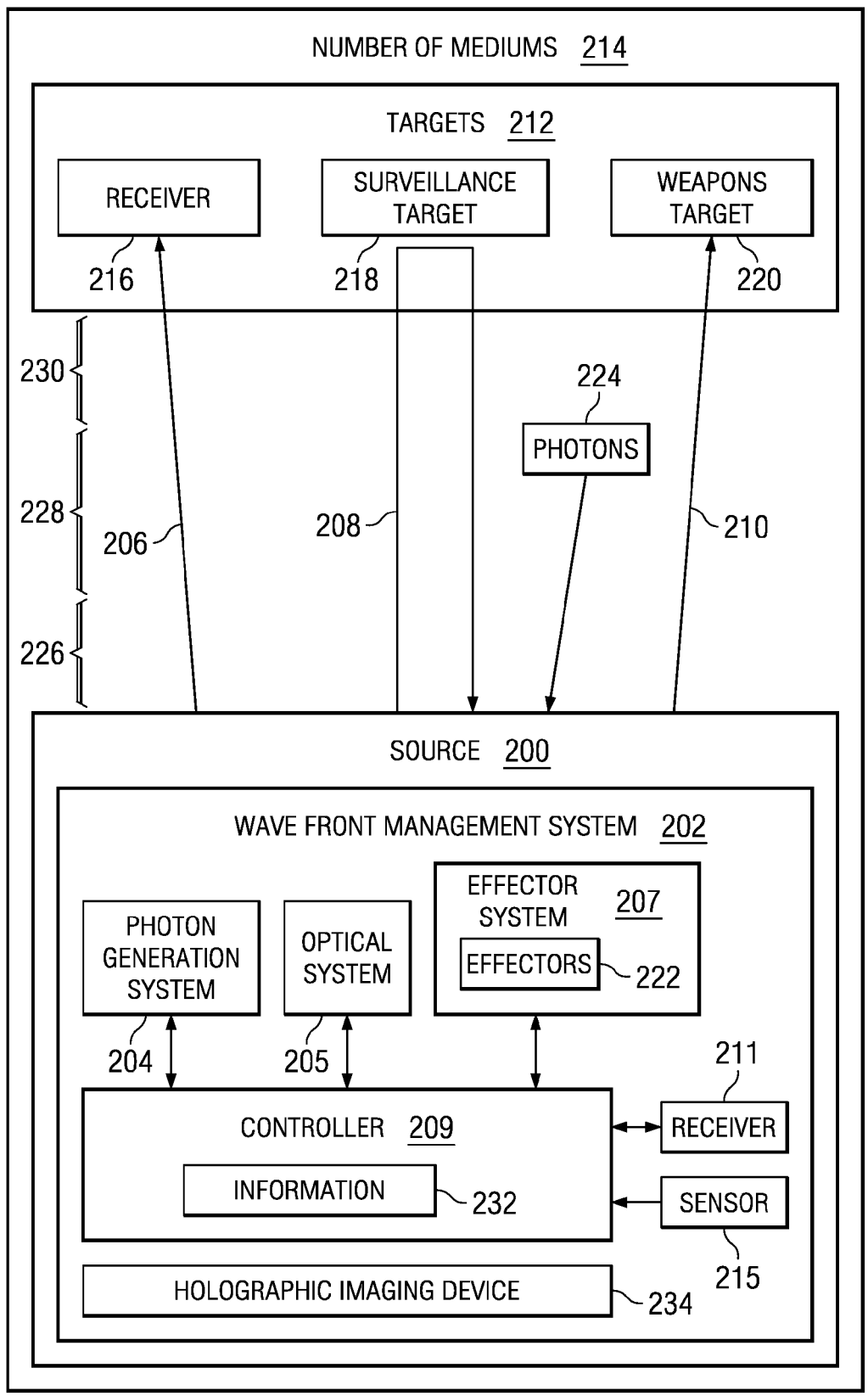
FIG. 2 is a diagram of a source in accordance with an advantageous embodiment.

Turning now to FIG. 2, a diagram of a source is depicted in accordance with an advantageous embodiment. In this illustrative example, source 200 is an example of one implementation for source 118 in FIG. 1. In this illustrative example, source 200 comprises wave front management system 202. Wave front management system 202 comprises photon generation system 204, optical system 205, effector system 207, and controller 209.

Photon generation system 204 generates photons which may be controlled by wave front management system 202 to transmit photons in a form of beams. In this illustrative example, source 200 transmits beam 206, beam 208, and beam 210. Photon generation system 204 may comprise at least one of a system of lasers, a system of deformable mirrors, a system of lenses, and/or some other system capable of transmitting beams 206, 208, and 210. As one example, photon generation system 204 may be a system of non-linear blue lasers. These blue lasers may be semiconductor laser diodes based on gallium nitride, other solid state lasers, rod lasers, free electron lasers, chemical lasers, and/or some other suitable type of laser.

Beam 208 is transmitted to targets 212 in number of mediums 214. In these illustrative examples, targets 212 include receiver 216, surveillance target 218, and weapons target 220. In this illustrative example, beam 206 may contain information used by receiver 216. Beam 208 may reflect and/or bounce off surveillance target 218 for detection by source 200. For example, beam 208 may be detected by source 200 using receiver 211. Beam 208 may be used to identify a range between source 200 and surveillance target 218. Beam 210 may cause damage to weapons target 220 in this example.

In the different advantageous embodiments, the generation of beams 206, 208, and 210 may be controlled based on identifying information about number of mediums 214. This information may be identified through detecting photons 224 in number of mediums 214. In these examples, photons 224 may be detected by source 200 using receiver 211. Receiver 211 may be any device capable of detecting photons such as, for example, without limitation, an optical detector, a phototransistor, a photovoltaic cell, and/or some other suitable type of receiver. In some advantageous embodiments, receiver 211 may take the form of a directional photodetector.

In these different illustrative examples, wave front management system 202 may control various properties of beams 206, 208, and 210. For example, without limitation, wave front management system 202 may control the direction, focus, power, tilt, tilt angle, phase, wavelength, amplitude, aperture size, and wave front for beams 206, 208, and 210.

In these illustrative examples, a wave front is a plurality of photons that share a property. This property may be, for example, phase. In these depicted examples, a wave front typically is a surface formed by photons having the same phase. For example, a wave front may have a shape of a line, plane, sphere, or some other suitable shape.

In some advantageous embodiments, a wave front may be a homogeneous set of properties observed in the near-field, mid-field, and/or far-field. In these examples, near-field 226, mid-field 228, and far-field 230 span the range of distances between source 200 and targets 212.

These fields represent a plurality of planar fields perpendicular to the transmission path of beams 206, 208, and 210. As depicted, near-field 226 refers to the plurality of planar fields within a range of distances immediate to source 200. Far-field 230 refers to the plurality of planar fields within a range of distances immediate to targets 212. Mid-field 228 refers to the plurality of planar fields between near-field 226 and far-field 230.

In some advantageous embodiments, beams 206, 208, and 210 may be homogenous, have a Gaussian distribution or speckled distribution, be formed by multiple beams, or have some combination of the above properties. In these examples, the distribution of beams 206, 208, and 210 may be controlled by wave front management system 202 with respect to power, direction, focus, tilt, tilt angle, phase, wavelength, amplitude, overall wave front properties, and/or other wave front properties.

In these illustrative examples, beams 206, 208, and 210 may take the form of planar waves. In the illustrative examples, wave front management system 202 may control photons generated by photon generation system 204 to control various properties of beams 206, 208, and 210. For example, these properties may include scatter, diffusion, diffraction, refraction, absorption, reflection, and other suitable properties for beams 206, 208, and 210. The controlling of these properties for beams 206, 208, and 210 may also be referred to as beam shaping.

In these illustrative examples, wave front management system 202 shapes beams 206, 208, and 210 using optical system 205 and/or photon generation system 204. Photons generated by photon generation system 204 propagate through optical system 205 when leaving source 200. Optical system 205 is configured to focus the photons in the beams. In the illustrative examples, optical system 205 may include a lens system. In other advantageous embodiments, optical system 205 may be any system capable of changing the optical properties of beams 206, 208, and 210.

In some advantageous embodiments, photon generation system 204 may affect beam shaping by turning on or off multiple lasers and/or making adjustments to the beams. These adjustments may include, for example, without limitation, changing the power, frequency, and/or phase of the beams, inducing an electromagnetic field, mechanically steering the beams, and/or making some other suitable adjustment to the beams.

Wave front management system 202 is configured to sense information about number of mediums 214 through which photons in beams 206, 208, and 210 travel. This sensing may be performed by a sensor such as, for example, sensor 215. For example, without limitation, sensor 215 may be configured to sense pressure, temperature, salinity, presence of aquatic life, presence of entrained air, depth, flow patterns, and/or other suitable characteristics of number of mediums 214. As one illustrative example, sensor 215 may be configured to sense photons 224 in beams 206, 208, and 210 at far-field 230, mid-field 228 and near-field 226. This sensing may be performed with and/or without the presence of targets 212. Wave front management system 202 uses this information to determine the effects of number of mediums 214 on the transmission of beams 206, 208, and 210.

Based on these effects, wave front management system 202 configures optical system 205 to control properties for beams 206, 208, and 210. In this manner, wave front management system 202 configures optical system 205 to shape beams 206, 208, and 210. Optical system 205 is also configured to compensate for dynamics within number of mediums 214, such as currents and eddies, and the flow of number of mediums 214 over moving source 200 and targets 212. Further, wave front management system 202 also configures optical system 205 to direct beams 206, 208, and 210 toward targets 212.

In these illustrative examples, wave front management system 202 may also use effector system 207 to shape beams 206, 208, and 210. Effector system 207 is configured to change a number of characteristics for number of mediums 214 through which photons in beams 206, 208, and 210 travel. For example, effector system 207 may be configured to transmit effectors 222 through number of mediums 214.

Effectors 222 may include, for example, without limitation, an electromagnetic field, a laser, a radio frequency field, an x-ray, bubbles, a tube, heat, pressure, salinity, a waveguide, fiber-optics, ionizing particles, an energy force, organic saturate absorbers, and/or any other suitable effectors. In these examples, effectors 222 are used to change the characteristics of number of mediums 214. Effector system 207 changes the characteristics of number of mediums 214 to shape beams 206, 208, and 210 along a path.

In these illustrative examples, controller 209 controls photon generation system 204, effector system 207, receiver 211, and/or some other suitable component within wave front management system 202. Further, controller 209 receives information from sensor 215. Controller 209 may be implemented in a number of different ways. For example, controller 209 may be a number of computers, a number of processor units, and/or some other suitable type of controller. For example, controller 209 may be a high-speed computer or a microprocessor chip using field-programmable gate arrays.

Controller 209 receives information 232 from sensor 215. Based on information 232, controller 209 identifies a number of characteristics for number of mediums 214. The number of characteristics for number of mediums 214 may be used to determine the effects of number of mediums 214 on the transmission of the beams in these examples.

In these depicted examples, controller 209 may also generate information 232 from receiver 211 detecting photons 224 within number of mediums 214. Controller 209 uses information 232 to control the transmission of beams 206, 208, and/or 210 by photon generation system 204. For example, controller 209 may send updated parameters to photon generation system 204 for the transmission of beams 206, 208, and/or 210. Photon generation system 204 may use these parameters to alter the transmission of the beams.

In these examples, controller 209 controls the transmission of effectors 222 by effector system 207. For example, based on information 232, controller 209 may control which effectors 222 are transmitted by effector system 207 to alter number of mediums 214. Further, controller 209 may control the characteristics of the transmission of effectors 222. As one illustrative example, controller 209 uses information 232 to determine the intensity of heat to be transmitted through number of mediums 214 during the transmission of beams by photon generation system 204.

Controller 209 also controls receiver 211. For example, when receiver 211 is a directional receiver, controller 209 uses information 232 to change the direction in which receiver 211 points. In some advantageous embodiments, controller 209 may control a time period during which receiver 211 detects photons in number of mediums 214.

In other advantageous embodiments, receiver 211 and controller 209 may be part of the same device. For example, receiver 211 and controller 209 may be part of holographic imaging device 234. Holographic imaging device 234 may generate and monitor a holographic image based on the detection of photons 224 at receiver 211. The holographic image is monitored to track changes in the optical properties of photons 224 in number of mediums 214 prior to, during, and/or after transmission of beams 206, 208, and/or 210 by photon generation system 204. In this example, controller 209 monitors the holographic image to generate information 232. The transmission of the beams by photon generation system 204 is then controlled by controller 209 using information 232.

In still other advantageous embodiments, controller 209 may control the configuration of optical system 205. For example, when optical system 205 comprises a system of lenses, controller 209 may use information 232 to change the position of the lenses, change the lens prescription for the lenses, and/or deform the lenses within optical system 205.

Thus, wave front management system 202 manages the properties of these beams as transmitted from source 200 to targets 212 such that these beams have desired properties when reaching targets 212. In other words, wave front management system 202 may include adjustments and/or corrections to parameters for beams generated to adjust or correct for changes that may be caused to properties for beams 206, 208, and 210 as the beams travel through number of mediums 214.

With reference now to FIGS. 3-7, diagrams illustrating the propagation of photons in a beam are depicted in accordance with advantageous embodiments. In these illustrative examples, the photons in the beam may be transmitted by a source such as, for example, source 200 in FIG. 2. Further, the source may use a wave front management system such as, for example, wave front management system 202 to transmit the beam.

Figure 3:
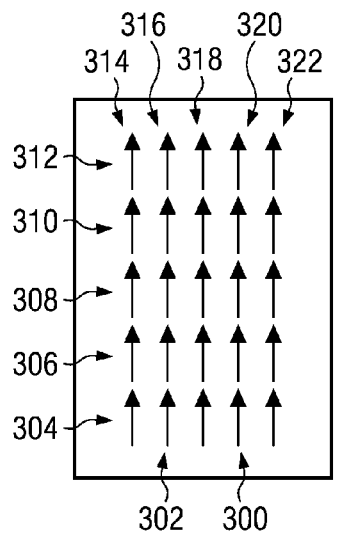
FIG. 3 is a diagram illustrating propagation of photons in accordance with an advantageous embodiment.

With reference now to FIG. 3, a diagram illustrating propagation of photons is depicted in accordance with an advantageous embodiment. In this illustrative example, photons 300 are transmitted as beam 302. In this illustrative example, photons 300 in beam 302 have wave fronts 304, 306, 308, 310, and 312. Photons 300 in beam 302 also may be characterized by rays 314, 316, 318, 320, and 322.

In this illustrative example, beam 302 is transmitted at an intensity that is the highest intensity at which the source can transmit a beam. At this intensity, photons 300 in beam 302 all have the same tilt and direction. In other words, photons 300 are all aligned with the same tilt and direction.

Figure 4:
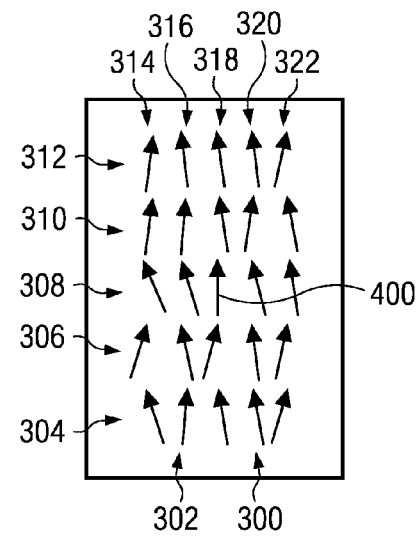
FIG. 4 is a diagram illustrating photons with different tilts in accordance with an advantageous embodiment.

Turning now to FIG. 4, a diagram illustrating photons with different tilts is depicted in accordance with an advantageous embodiment. In this illustrative example, photons 300 in beam 302 are transmitted at an intensity substantially lower than depicted in FIG. 3. At this intensity, photons 300 have different tilts. Further, at this intensity, only photon 400 in beam 302 is aligned with the same tilt and direction as photons 300 in FIG. 3.

Figure 5:
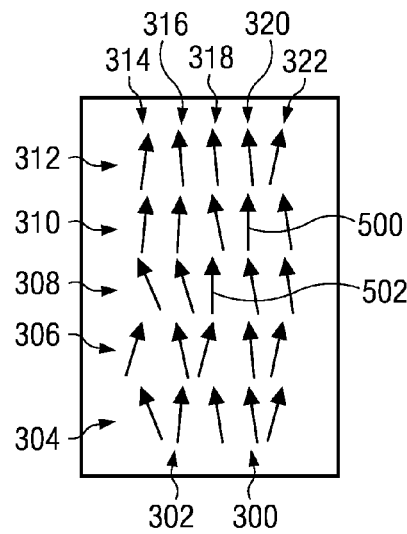
FIG. 5 is a diagram illustrating photons with different tilts in accordance with an advantageous embodiment.

Turning now to FIG. 5, a diagram illustrating photons with different tilts is depicted in accordance with an advantageous embodiment. In this illustrative example, photons 300 in beam 302 are transmitted at an intensity greater than depicted in FIG. 4, but lower than depicted in FIG. 3. In this example, both photon 500 and photon 502 are aligned with the same tilt and direction as photons 300 in FIG. 3, which are transmitted at the higher intensity.

Figure 6:
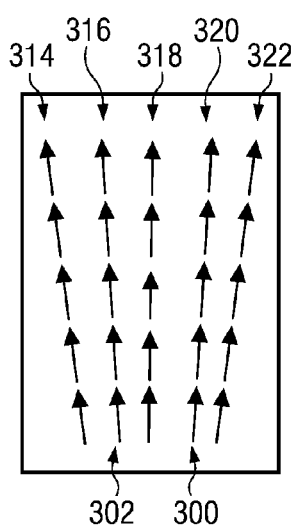
FIG. 6 is a diagram illustrating diffusion of photons in accordance with an advantageous embodiment.

With reference now to FIG. 6, a diagram illustrating diffusion of photons is depicted in accordance with an advantageous embodiment. In this illustrative example, properties of beam 302 are changed to cause diffusion of photons 300 in beam 302.

Figure 7:
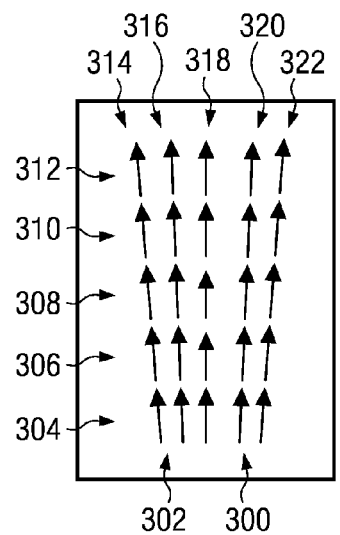
FIG. 7 is a diagram illustrating diffusion of photons in accordance with an advantageous embodiment.

With reference now to FIG. 7, a diagram illustrating diffusion of photons is depicted in accordance with an advantageous embodiment. In this illustrative example, properties of beam 302 are changed to cause diffusion of photons 300 in beam 302. As depicted, this diffusion of photons 300 may be decreased as compared to the diffusion of photons 300 in FIG. 6.

Figure 8:
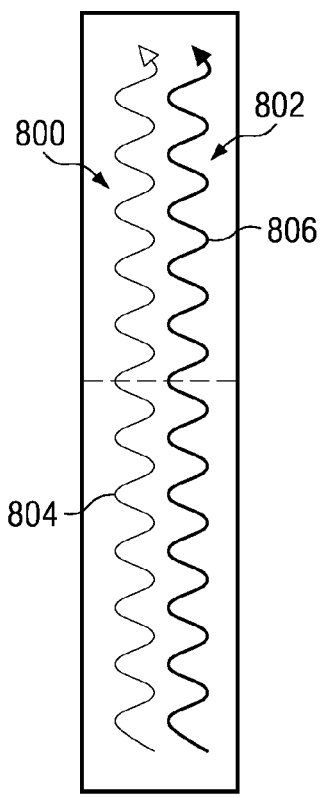
FIG. 8 is a diagram illustrating phases in a wave front in accordance with an advantageous embodiment.

With reference next to FIG. 8, a diagram illustrating phases in a wave front is depicted in accordance with an advantageous embodiment. In this illustrative example, path 800 and path 802 are shown for photons 804 and 806. Photons 804 and 806 are generated by a source such as, for example, source 118 in FIG. 1. More specifically, photons 804 and 806 may be generated by a photon generation system such as, for example, photon generation system 204 in FIG. 2. As can be seen in this illustrative example, photons 804 and photons 806 are adjusted by wave front management system to be in phase.

Figure 9:
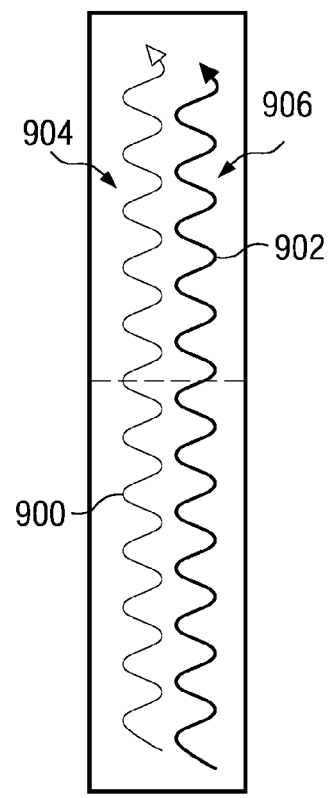
FIG. 9 is a diagram illustrating a wave front with photons out of phase in accordance with an advantageous embodiment.

Turning now to FIG. 9, a diagram illustrating a wave front with photons out of phase is depicted in accordance with an advantageous embodiment. In this illustrative example, photons 900 and 902 are generated by a source such as, for example, source 118 in FIG. 1. More specifically, photons 900 and 902 may be generated by a photon generation system such as, for example, photon generation system 204 in FIG. 2. Photons 900 and photons 902 travel along path 904 and path 906, respectively. As can be seen in this illustrative example, photons 900 are out of phase with respect to photons 902.

The wave front management system in a different advantageous embodiment is configured to manage the phases of photons within the wave front. Changing the phases of photons may be used to provide properties for a beam containing photons that may allow the beam to have the desired properties to reach a target. This type of wave front management, as well as other types of management, may be used to compensate for different factors that may occur from subsurface propagation, surface refraction, air propagation, clouds, and other phenomena.

For example, in air, the different advantageous embodiments may correct for air turbulence, which may have different pressures, swirls, eddies, thermal gradients, and/or other characteristics that affect the transmission of photons. The wave front management may include optical transmission adjustments made from the photons after being generated by a laser system. This management may include shifting and/or stretching optical phases.

Figure 10:
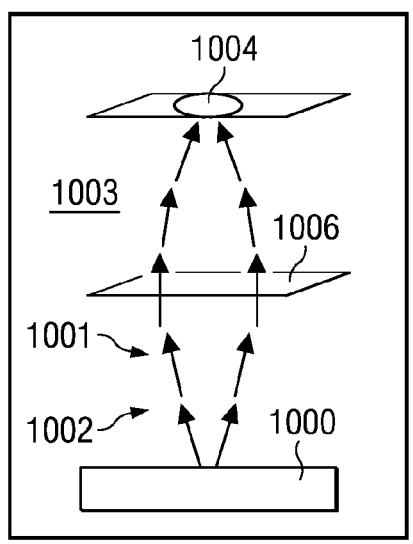
FIG. 10 is a diagram illustrating wave front management of photons in accordance with an advantageous embodiment.

Turning now to FIG. 10, a diagram illustrating wave front management of photons is depicted in accordance with an advantageous embodiment. In this illustrative example, wave front management system 1000 transmits photons 1001 in beam 1002 through medium 1003. Wave front management system 1000 may be one example of one implementation of wave front management system 202 in source 200 in FIG. 2. Photons 1001 are transmitted in a manner such that photons 1001 reach target 1004 with desired properties. In other words, the transmission of photons 1001 in beam 1002 is directed such that beam 1002 reaches target 1004.

In this illustrative example, beam 1002 has properties in medium 1003. For example, without limitation, beam 1002 is scattered and diffracted in medium 1003. When photons 1001 in beam 1002 reach mid-field 1006, photons 1001 are diffused, scattered, and/or refracted. Near-field 1006 may be, for example, without limitation, a medium, a transition in medium 1003 from one medium to another medium, or some other characteristic of medium 1003 in which photons 1001 travel.

In this depicted example, wave front management system 1000 detects the changes caused by mid-field 1006 on the transmission of photons 1001. Based on these effects, wave front management system 1000 is configured to control the properties of beam 1002 during transmission. In this manner, wave front management system 1000 is configured to direct photons 1001 towards mid-field 1006 in a manner that causes photons 1001 to be diffracted towards target 1004. In this manner, wave front management system 1000 is configured to focus photons 1001 on target 1004.

Figure 11:
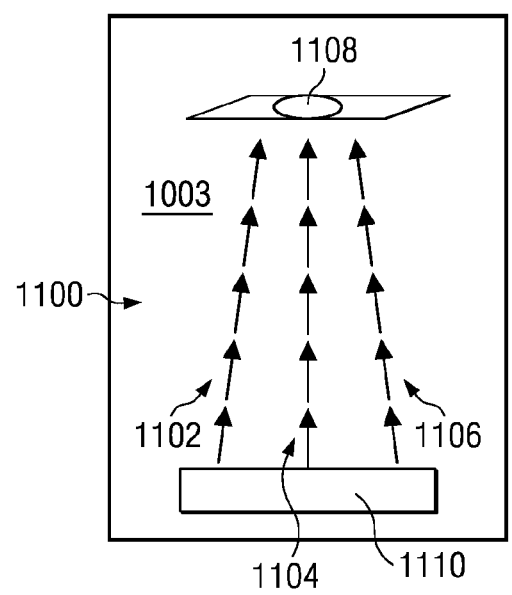
FIG. 11 is a diagram illustrating multi-beam transmission in accordance with an advantageous embodiment.

Turning now to FIG. 11, a diagram illustrating multi-beam transmission is depicted in accordance with an advantageous embodiment. In this illustrative example, photons 1100 are transmitted by a source such as, for example, source 200 in FIG. 2. Photons 1100 are transmitted in beams 1102, 1104, and 1106 to reach target 1108. Photons 1100 in beams 1102, 1104, and 1106 are transmitted by wave front management system 1110. These beams are directed in a manner such that beams 1102, 1104, and 1106 all reach target 1108.

Figure 12:
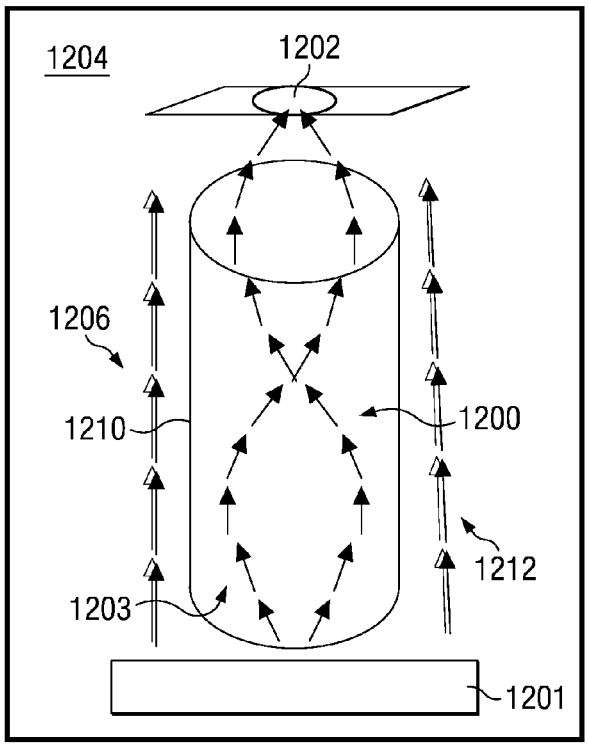
FIG. 12 is a diagram illustrating management of the transmission of photons by changing the characteristics of a medium in accordance with an advantageous embodiment.

Turning now to FIG. 12, a diagram illustrating management of the transmission of photons by changing the characteristics of a medium is depicted in accordance with an advantageous embodiment. In this illustrative example, photons 1200 are transmitted by wave front management system 1201 to reach target 1202. Wave front management system 1201 may be one example of one implementation for wave front management system 202 in FIG. 2. The transmission of photons 1200 in beam 1203 is controlled through changes to medium 1204. In this illustrative example, portion 1206 of medium 1204 is changed along path 1210 of photons in beam 1203.

In this illustrative example, wave front management system 1201 uses effectors 1212 to change portion 1206. Effectors 1212 may be examples of effectors, such as effectors 222 in FIG. 2. These effectors may change characteristics of medium 1204 such as, for example, without limitation, temperature, pressure, salinity, or other suitable characteristics. Effectors 1212 may include, for example, without limitation, laser beams, x-rays, heat, pressure, organic saturate absorbers, ionized particles, and/or any other suitable effectors.

Figure 13:
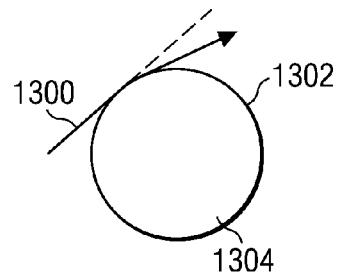
FIG. 13 is a diagram of the bending of light along a surface in accordance with an advantageous embodiment.

With reference now to FIG. 13, a diagram of the bending of light along a surface is depicted in accordance with an advantageous embodiment. In this illustrative example, beam 1300 is transmitted towards surface 1302 of object 1304 by a source. This source may be, for example, source 118 in FIG. 1. Properties of surface 1302 cause beam 1300 to bend around surface 1302 of object 1304. A wave front management system may take advantage of the properties of surface 1302 and the effect of surface 1302 on beam 1300.

Figure 14:
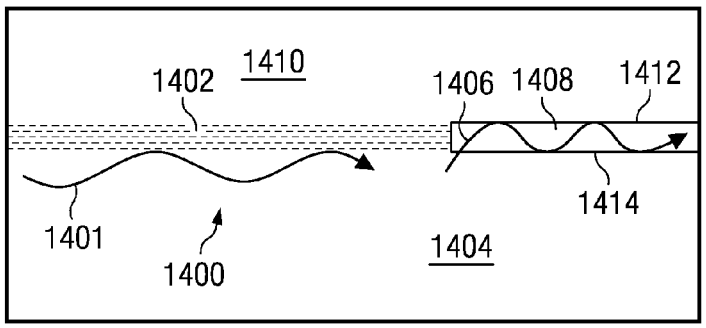
FIG. 14 is a diagram of the transmission of a beam in accordance with an advantageous embodiment.

Turning now to FIG. 14, a diagram of the transmission of a beam is depicted in accordance with an advantageous embodiment. In this illustrative example, beam 1400 is transmitted by a source such as, for example, without limitation, source 118 in FIG. 1. As depicted in this illustrative example, beam 1400 may be transmitted within path 1401 through medium 1404 along surface 1402 of medium 1404.

Beam 1400 is bent in a manner that maintains the transmission of beam 1400 within a width of path 1401. For example, the pressure and/or temperature of medium 1404 may be used to bend beam 1400 along surface 1402. In other examples, beam 1400 may be transmitted in a manner that grazes surface 1402. Grazing of surface 1402 may be caused by the refractive and/or reflective properties of surface 1402. Grazing of surface 1402 causes beam 1400 to bend and travel within path 1401 as depicted. In other words, beam 1400 may skip along surface 1402 within path 1401 as depicted.

As further depicted in this example, beam 1400 may be generated within medium 1404 and may then follow path 1406 within medium 1408. In this illustrative example, medium 1408 may be a semi-opaque solid, such as ice. The transition between medium 1408 and medium 1410 may be surface 1412, and the transition between medium 1408 and medium 1404 may be surface 1414. The reflective and/or refractive properties of surface 1412 and surface 1414 may allow beam 1400 to follow path 1406 within medium 1408.

In these illustrative examples, surface 1412 and surface 1414 may be continuous transitions. In other advantageous embodiments, surface 1412 and/or surface 1414 may be non-continuous transitions. In these examples, the reflective and/or refractive properties of these non-continuous properties may be used to control the propagation of beam 1400 along path 1406. In some advantageous embodiments, beam 1400 may originate within medium 1410. In still other advantageous embodiments, beam 1400 may enter medium 1408 from surface 1402.

Figure 15:
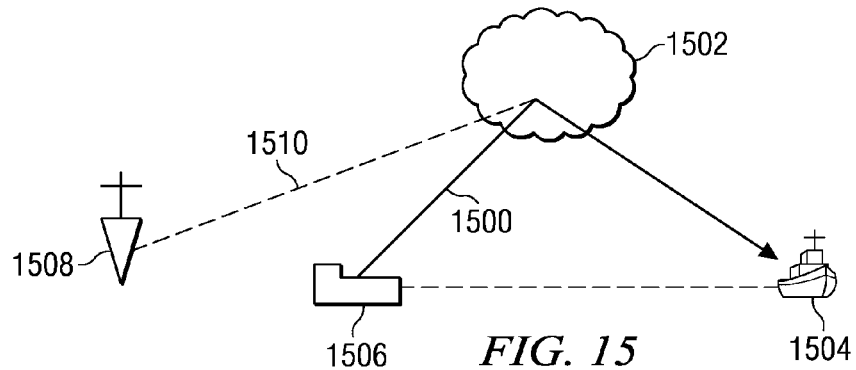
FIG. 15 is a diagram of a beam reflected by or through a cloud in accordance with an advantageous embodiment.

Turning now to FIG. 15, a diagram of a beam reflected by or through a cloud is depicted in accordance with an advantageous embodiment. In this illustrative example, beam 1500 may be transmitted by a source such as, for example, source 200 in FIG. 2. Beam 1500 travels toward cloud 1502 and reflects off of cloud 1502. The reflective properties of cloud 1502 are used to control the transmission of beam 1500. In this manner, beam 1500 is focused towards target 1504. Beam 1500 may be used for a number of operations, such as communications 121, ranging 122, surveillance 124, and/or damage generation 126 as depicted in FIG. 1.

As one illustrative example, the source may be weapon 1506, and target 1504 may be a ship. In this illustrative example, target 1504 may be an enemy ship. Beam 1500 is focused towards a sensor system on the enemy ship. Beam 1500 is used to prevent the sensor system from detecting weapon 1506. This weapon may be, for example, without limitation, a cruise missile.

In other advantageous embodiments, the source may be transmitter 1508. Transmitter 1508 may be, for example, a land-based structure, a second ship, and/or some other suitable transmitter. Transmitter 1508 may transmit beam 1510 towards cloud 1502. Beam 1510 propagates towards cloud 1502 and reflects off of cloud 1502 in a manner similar to beam 1500. Transmitter 1508 prevents target 1504 from detecting weapon 1506.

Figure 16:
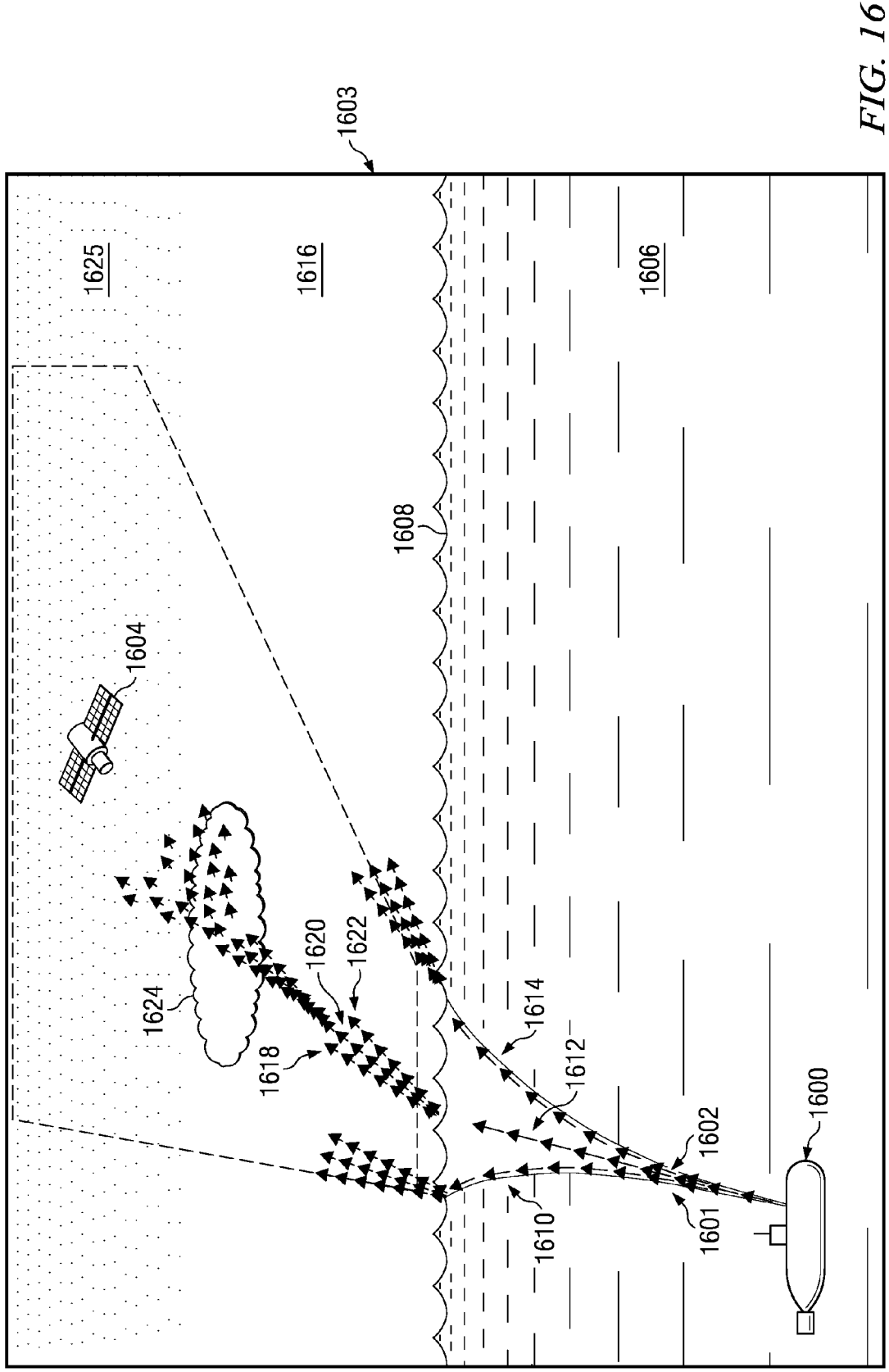
FIG. 16 is an illustration of a submarine sending photons towards a satellite in accordance with an advantageous embodiment.

With reference now to FIG. 16, an illustration of a submarine sending photons towards a satellite is depicted in accordance with an advantageous embodiment. In this illustrative example, submarine 1600 may be one example of one implementation for source 118 in FIG. 1. Submarine 1600 sends beam 1601 of photons 1602 to satellite 1604 through number of mediums 1603. In these examples, number of mediums 1603 may include, for example, water 1606, atmosphere 1616, cloud 1624, and outer space 1625.

Submarine 1600 sends photons 1602 through water 1606. Below surface 1608 of water 1606, beam 1601 is altered in water 1606. For example, without limitation, beam 1601 may be scattered, diffused, and absorbed in water 1606. As photons 1602 in beam 1601 propagate through water 1606 towards surface 1608, beam 1601 is scattered into, for example, portions 1610, 1612, and 1614 of beam 1601. Upon reaching the transition between water 1606 and atmosphere 1616 at surface 1608, portions 1610, 1612, and 1614 may be further altered. In this example, portions 1610, 1612, and 1614 of photons 1602 are reflected, scattered, and refracted.

For example, without limitation, portion 1612 is refracted at surface 1608 and further scattered into portions 1618, 1620, and 1622 of photons 1602 and beam 1601. These portions propagate through atmosphere 1616. In a similar manner, portions 1610 and 1614 are refracted and scattered at surface 1608. As photons 1602 continue to propagate through atmosphere 1616 towards satellite 1604, beam 1601 is still further altered. In this example, photons 1602 in beam 1601 are scattered, diffused, and absorbed in atmosphere 1616.

As depicted, cloud 1624 may be present in atmosphere 1616. Clouds may cause additional changes to beam 1601 as beam 1601 travels through atmosphere 1616. For example, cloud 1624 may cause photons 1602 in portion 1620 of beam 1601 to scatter, diffuse, reflect, and/or refract through atmosphere 1616. Photons 1602 in beam 1601 propagate through atmosphere 1616 and through outer space 1625 towards satellite 1604.

As depicted in this illustrative example, only a portion of photons 1602 in beam 1601 may reach satellite 1604. Other portions of photons 1602 may be scattered through water 1606, atmosphere 1616, cloud 1624, and outer space 1625. In this example, beam 1601 may be a beam transmitted by submarine 1600 without the use of a wave front management system such as, for example, wave front management system 202 in FIG. 2.

Figure 17:
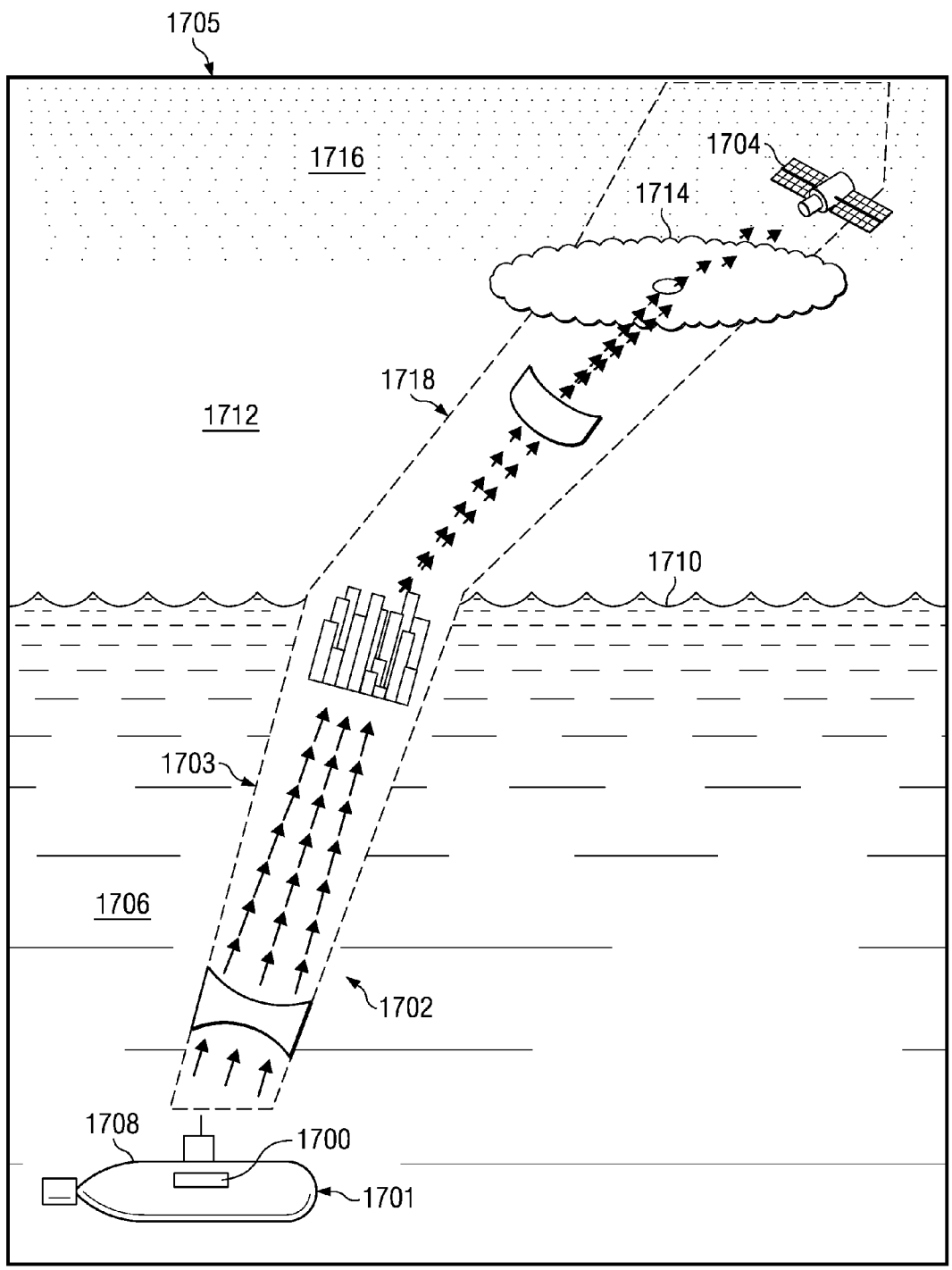
FIG. 17 is an illustration of the use of a wave front management system in accordance with an advantageous embodiment.

With reference now to FIG. 17, an illustration of the use of a wave front management system is depicted in accordance with an advantageous embodiment. In this illustrative example, wave front management system 1700 is one example of one implementation of wave front management system 202 in FIG. 2. Submarine 1701 is an example of one implementation of source 200 in FIG. 2. In some advantageous embodiments, the source for wave front management system 1700 may be some other suitable subsurface platform.

In this illustrative example, wave front management system 1700 is used to transmit photons 1702 in beam 1703 from submarine 1701 to satellite 1704 through number of mediums 1705. Number of mediums 1705 includes, for example, water 1706, atmosphere 1712, cloud 1714, and outer space 1716.

In these illustrative examples, wave front management system 1700 is configured to alter the properties of beam 1703 during propagation of photons 1702 in beam 1703 through water 1706. For example, wave front management system 1700 is configured to alter the scattering, diffusion, absorption, and/or some other property of beam 1703 through water 1706.

In these examples, wave front management system 1700 may include a photon generation system, such as photon generation system 204 in FIG. 2. This photon generation system may take the form of a collection of blue lasers. These blue lasers transmit photons 1702 in beam 1703. Further, these blue lasers transmit beam 1703 through structure 1708 associated with submarine 1701. A first component may be considered to be associated with a second component by being secured to the second component, bonded to the second component, fastened to the second component, and/or connected to the second component in some other suitable manner. The first component may also be considered to be associated with the second component by being formed as part of and/or an extension of the second component.

In these examples, structure 1708 is associated with submarine 1701 by being externally attached to submarine 1701. In other advantageous embodiments, structure 1708 may be a part of submarine 1701 or located within submarine 1701. In these examples, beam 1703 may pass through structure 1708 through an optical system, such as optical system 205 in FIG. 2, associated with wave front management system 1700.

Beam 1703 is shaped by wave front management system 1700. This shaping of beam 1703 changes the properties for beam 1703 of photons 1702. The shaping of beam 1703 allows photons 1702 to be more focused towards satellite 1704. Shaping of beam 1703 may also be used to target beam 1703 for an intended purpose. For example, beam 1703 may be shaped to excite aquatic life, saturate photon-absorbing elements, perform sensing and/or surveillance functions, provide communications, and/or target weapon systems.

In this illustrative example, beam 1703 travels through water 1706 and through surface 1710 of water 1706. Wave front management system 1700 takes into account alterations to beam 1703 that may occur at surface 1710. For example, wave front management system 1700 is configured to shape beam 1703 and alter the properties of beam 1703 as beam 1703 travels through surface 1710. As depicted, wave front management system 1700 is configured to alter the refraction and dispersion of beam 1703 at surface 1710.

Photons 1702 in beam 1703 pass through atmosphere 1712. Wave front management system 1700 is further configured to alter the properties of beam 1703 as beam 1703 propagates through atmosphere 1712. As depicted, wave front management system 1700 is also configured to alter the properties of beam 1703 as beam 1703 propagates through cloud 1714 and outer space 1716. For example, wave front management system 1700 is configured to alter the scattering, diffusion, reflection, and refraction of photons 1702 in beam 1703 as beam 1703 passes through atmosphere 1712, cloud 1714, and outer space 1716.

In this illustrative example, wave front management system 1700 is capable of focusing path 1718 of beam 1703 towards satellite 1704. In this example, beam 1703 is more focused towards satellite 1704 than beam 1601 towards satellite 1604 in FIG. 16. Further, a greater portion of photons 1702 in beam 1703 may reach satellite 1704 in this depicted example.

The different advantageous embodiments take into account and recognize that a transition between two mediums may be constantly changing. For example, the surface at the transition between water and the atmosphere may be constantly changing due to the passing of waves along the surface. The different advantageous embodiments take into account and recognize that as a surface changes, the properties of a beam traveling through the surface may change as well. The different advantageous embodiments take into account and recognize that a wave front management system that accounts for the changes in mediums 1705 and at surface 1710 may be desirable.

Figure 18:
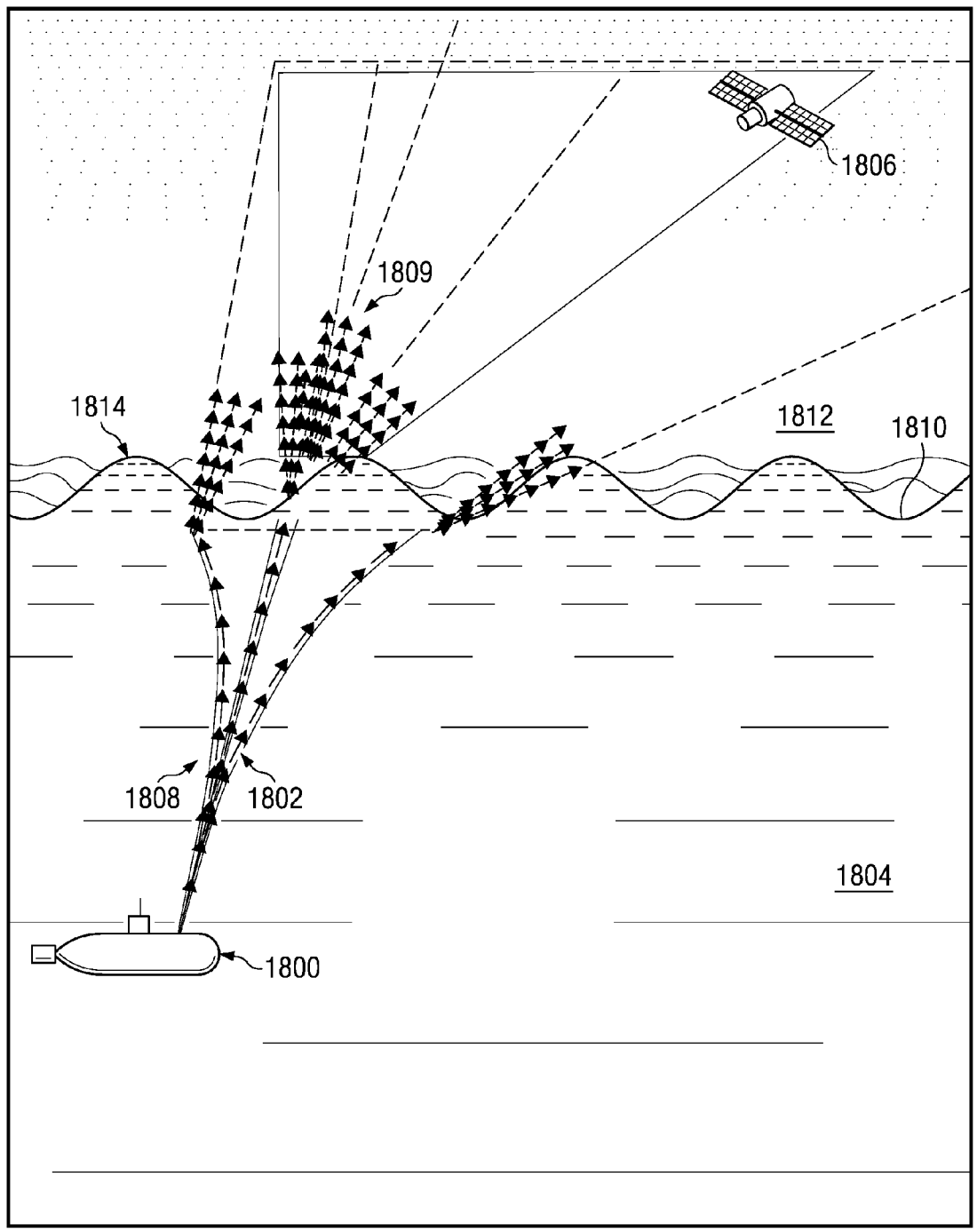
FIG. 18 is an illustration of a submarine transmitting photons in accordance with an advantageous embodiment.

With reference now to FIG. 18, an illustration of a submarine transmitting photons is depicted in accordance with an advantageous embodiment.

In this illustrative example, submarine 1800 transmits photons 1802 through water 1804 towards satellite 1806. Submarine 1800 is one example of source 118 in FIG. 1.

In this illustrative example, photons 1802 are transmitted through water 1804 in beam 1808. As depicted, photons 1802 are scattered, dispersed, and diffracted through water 1804. At surface 1810 of water 1804, photons 1802 in beam 1808 are refracted in number of directions 1809. Photons 1802 are transmitted through atmosphere 1812 in number of directions 1809. As depicted, only a portion of photons 1802 passing through atmosphere 1812 may reach satellite 1806.

Photons 1802 are refracted in number of directions 1809 due to photons 1802 hitting surface 1810 at different angles. Photons 1802 may hit surface 1810 at different angles due to the passing of waves 1814 along surface 1810. As waves 1814 pass along surface 1810, the angle at which photons 1802 pass through surface 1810 changes. These changes in angle cause photons 1802 to be refracted in number of directions 1809 as depicted. In these illustrative examples, waves 1814 are one example of a transition between water 1804 and atmosphere 1812.

Figure 19:
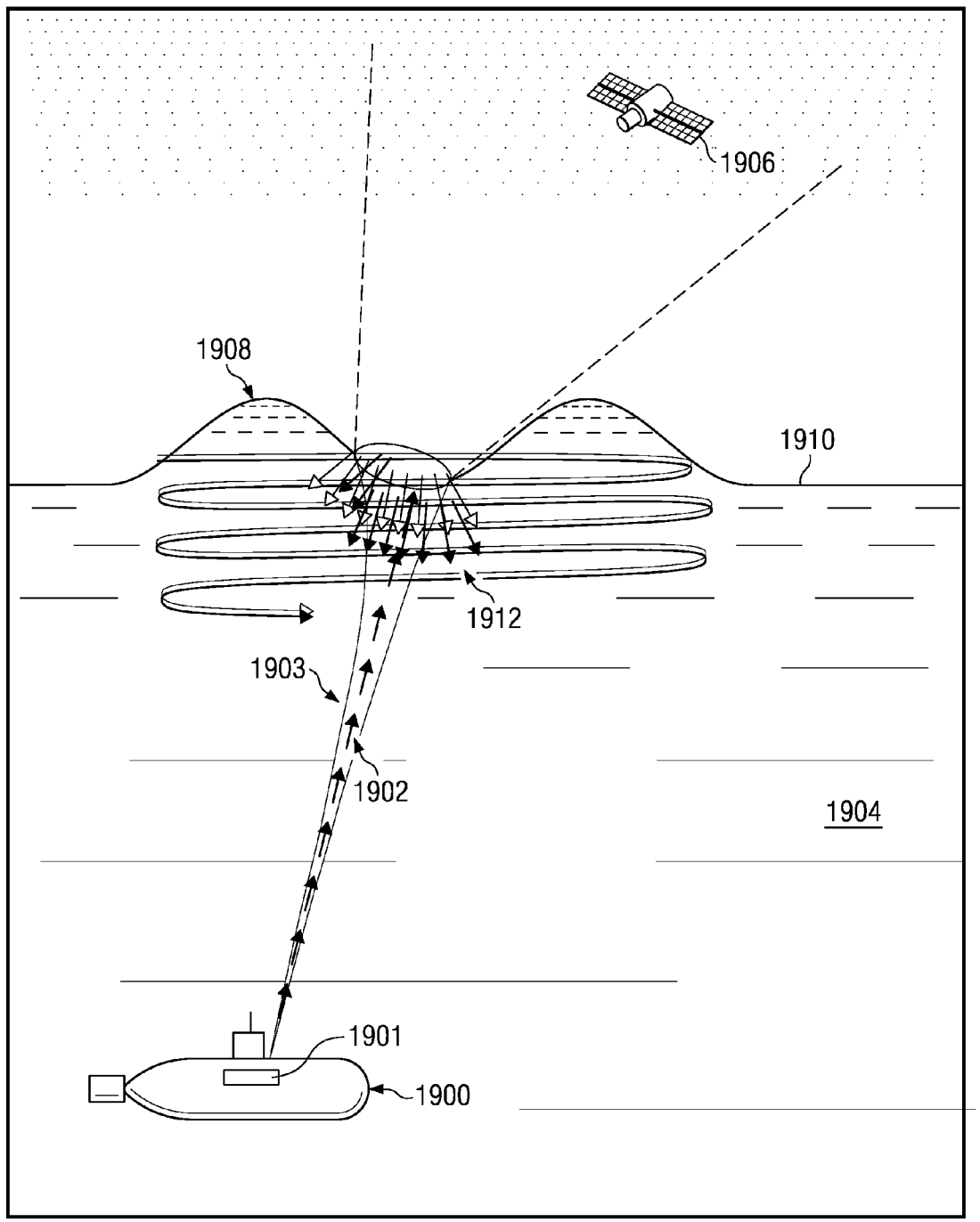
FIG. 19 is an illustration of the use of a wave front management system to map surface wave conditions in accordance with an advantageous embodiment.

With reference now to FIG. 19, an illustration of the use of a wave front management system to map surface wave conditions is depicted in accordance with an advantageous embodiment. In this illustrative example, submarine 1900 uses wave front management system 1901 to transmit photons 1902 through water 1904 to satellite 1906. In this example, wave front management system 1901 is one example of one implementation for wave front management system 202 in FIG. 2. Wave front management system 1901 is configured to focus photons 1902 as waves 1908 pass along surface 1910 of water 1904.

In this depicted example, wave front management system 1901 is configured to gather information about surface 1910. For example, wave front management system 1901 tracks the formation and passing of waves 1908 along surface 1910. More specifically, wave front management system 1901 may track the contour of waves 1908 at surface 1910 to determine the angles at which photons 1902 may hit surface 1910.

As submarine 1900 transmits photons 1902 through water 1904, wave front management system 1901 monitors reflection 1912 of photons 1902 at surface 1910 to track the contour of waves 1908. In other words, wave front management system 1901 monitors reflection 1912 of photons 1902 to gather information about the angles at which photons 1902 hit surface 1910. This information is used by wave front management system 1901 to control photons 1902 in beam 1903.

In other words, wave front management system 1901 uses this information to control the properties of photons 1902 in beam 1903 during the transmission of beam 1903. In this manner, wave front management system 1901 can control the number of directions in which photons 1902 refract at surface 1910. By controlling refraction of photons 1902 in beam 1903, wave front management system 1901 causes a greater portion of photons 1902 transmitted from submarine 1900 to reach satellite 1906.

Figure 20:
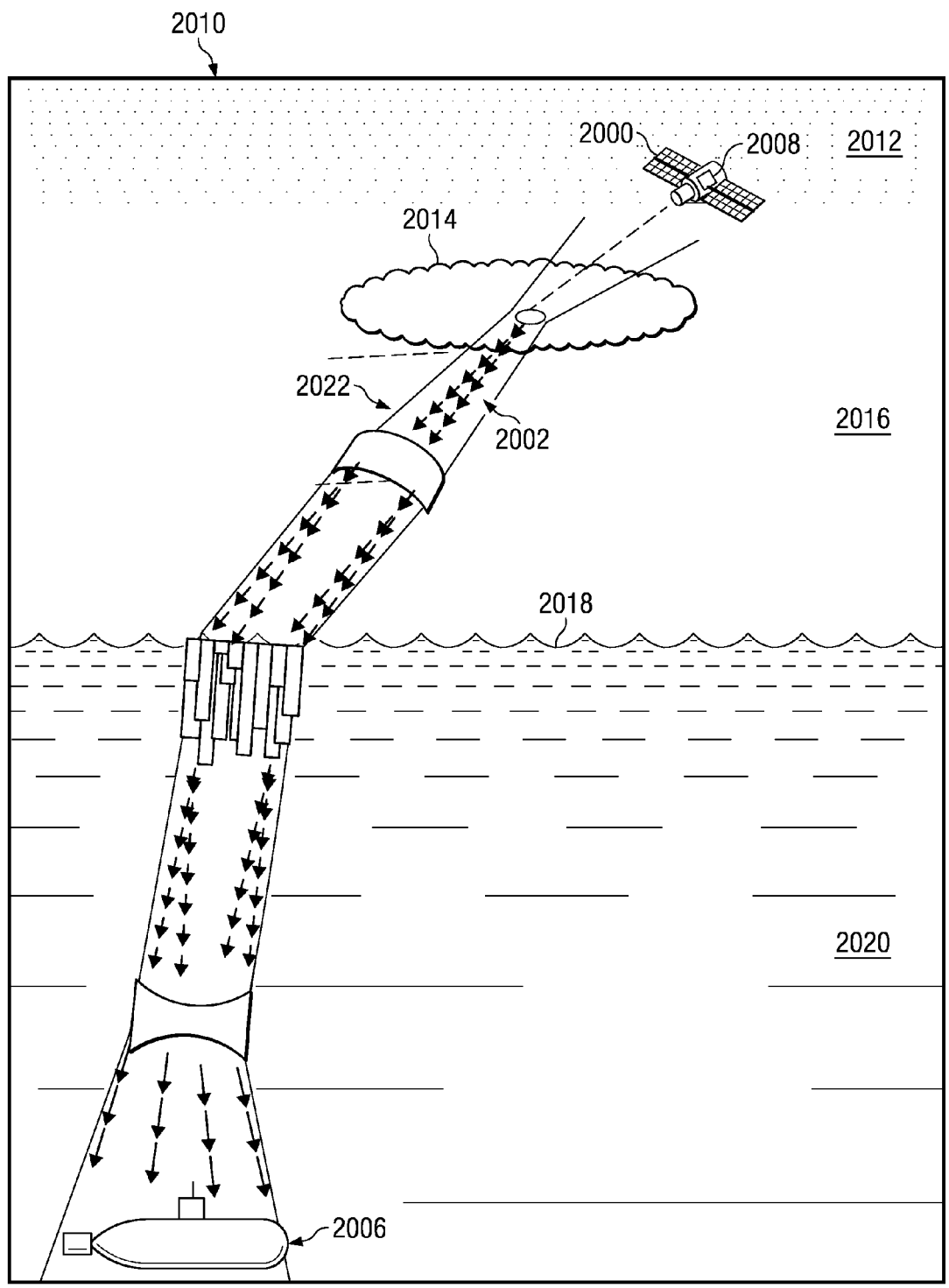
FIG. 20 is a diagram of a wave front management system in accordance with an advantageous embodiment.

With reference now to FIG. 20, a diagram of a wave front management system is depicted in accordance with an advantageous embodiment. In this illustrative example, satellite 2000 transmits photons 2002 through atmosphere 2016 towards submarine 2006. In this example, satellite 2000 uses wave front management system 2008 to control properties and transmission of photons 2002 through number of mediums 2010.

In this illustrative example, number of mediums 2010 includes outer space 2012, cloud 2014, atmosphere 2016, surface 2018, water 2020, and/or other suitable mediums. Wave front management system 2008 is configured to control properties of photons 2002 in beam 2022 through number of mediums 2010. For example, wave front management system 2008 may control scattering, diffraction, reflection, diffusion, and refraction of photons 2002 through number of mediums 2010.

Figure 21:
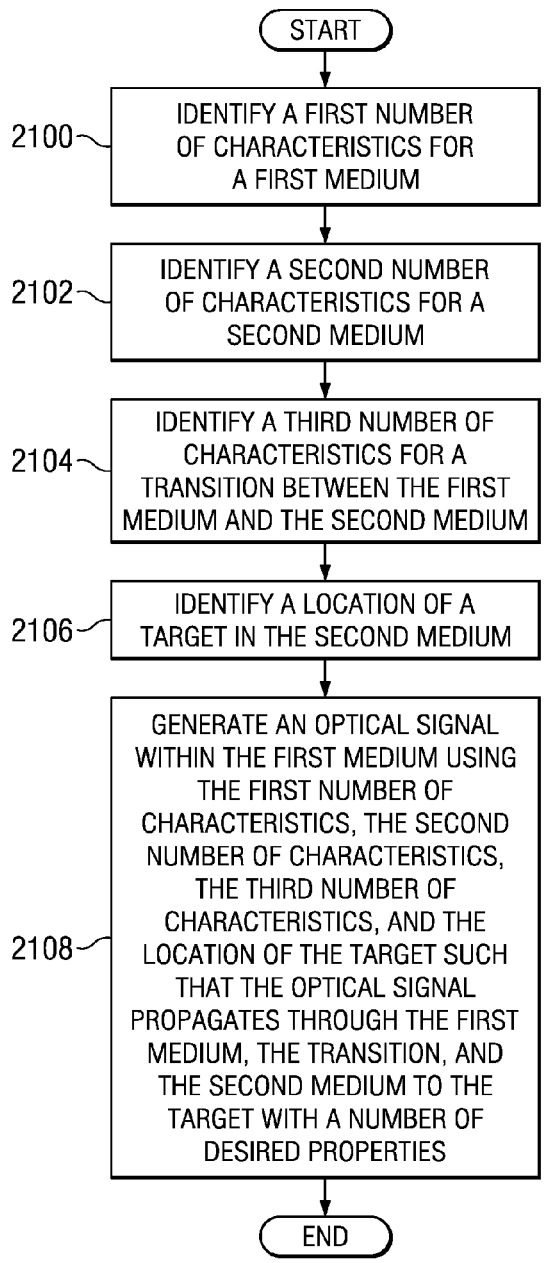
FIG. 21 is a flowchart of a process for managing the transmission of optical signals in accordance with an advantageous embodiment.

With reference now to FIG. 21, a flowchart of a process for managing the transmission of optical signals is depicted in accordance with an advantageous embodiment. The process illustrated in FIG. 21 may be implemented using a wave front management system such as, for example, wave front management system 202 in FIG. 2.

The process begins by identifying a first number of characteristics for a first medium (operation 2100). The process then identifies a second number of characteristics for a second medium (operation 2102). Thereafter, the process identifies a third number of characteristics for a transition between the first medium and the second medium (operation 2104).

The process then identifies a location of a target in the second medium (operation 2106). Thereafter, the process generates an optical signal within the first medium using the first number of characteristics, the second number of characteristics, the third number of characteristics, and the location of the target such that the optical signal propagates through the first medium, the transition, and the second medium to the target with a number of desired properties (operation 2108), with the process terminating thereafter.

In this illustrative example, propagation of the optical signal through the transition may change a focus of the optical signal to provide the number of desired properties for the optical signal when the optical signal reaches the target.

In these examples, the generation of the optical signal in operation 2108 may also involve altering at least one of the first medium, the second medium, and the transition. For example, a number of characteristics of a portion of the first medium may be changed taking into account at least one of the first number of characteristics, the second number of characteristics, and the third number of characteristics. This modification may form a modified portion of the first medium through which the optical signal travels to reach the target in the second medium with the number of desired properties.

Alteration of the first medium, the second medium and/or transition may be performed in the illustrative examples by transmitting effectors through the first medium, the second medium and/or transition to change the characteristics of the mediums and/or transition.

In other advantageous embodiments, a process similar to the process described in FIG. 21 may be implemented for more than two mediums and one transition.

Figure 22:
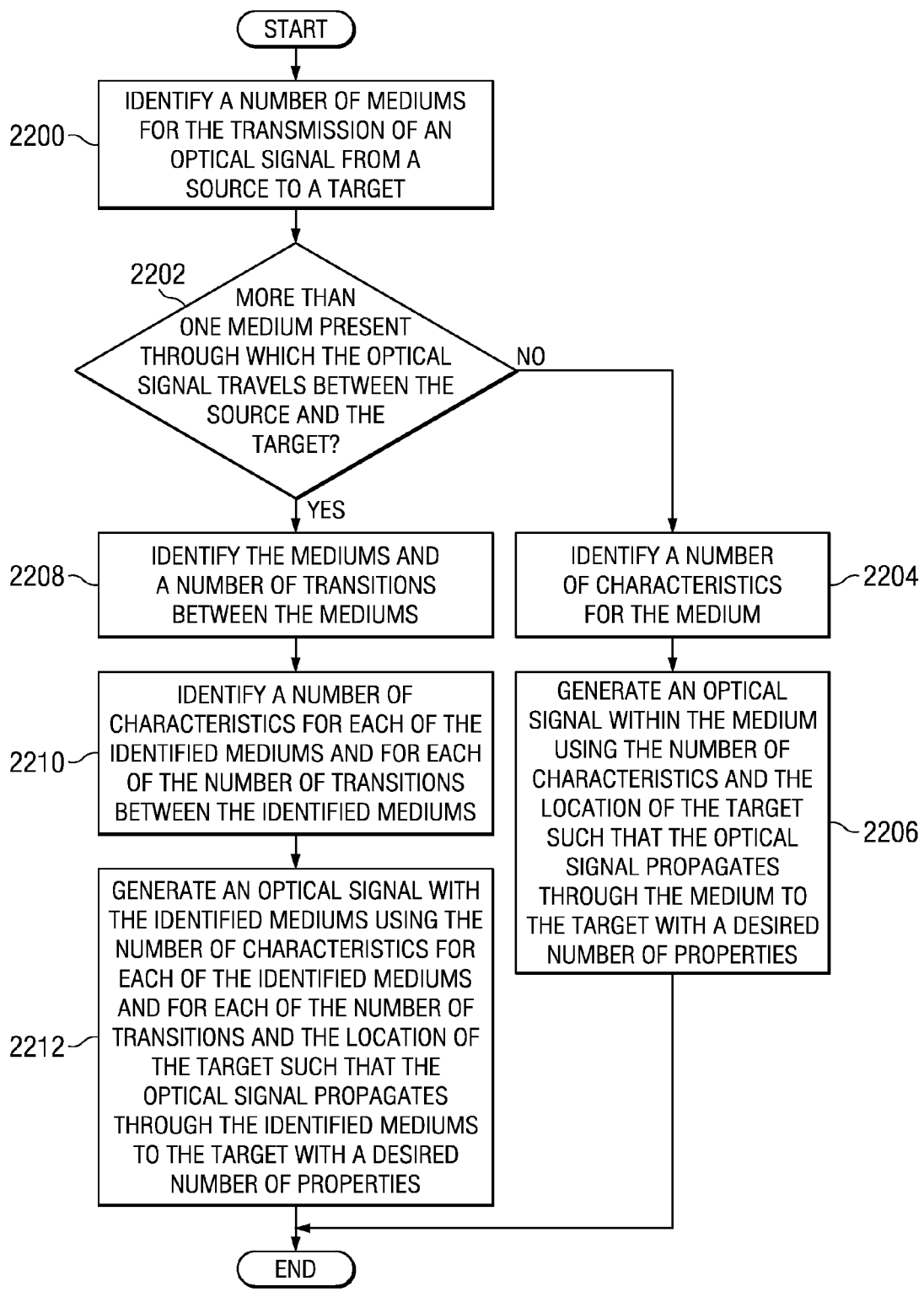
FIG. 22 is a flowchart of a process for identifying a number of mediums and/or a number of transitions in accordance with an advantageous embodiment.

With reference now to FIG. 22, a flowchart of a process for identifying a number of mediums and/or a number of transitions is depicted in accordance with an advantageous embodiment. The process illustrated in FIG. 22 may be implemented prior to the implementation of the process described in FIG. 21. Further, the process illustrated in FIG. 22 may be implemented using a wave front management system such as, for example, wave front management system 202 in FIG. 2.

The process begins by identifying a number of mediums for the transmission of an optical signal from a source to a target (operation 2200). The process then determines whether more than one medium are present through which the optical signal travels between the source and the target (operation 2202). If only one medium is present, the process then identifies a number of characteristics for the medium (operation 2204). Thereafter, the process generates an optical signal within the medium using the number of characteristics and the location of the target such that the optical signal propagates through the medium to the target with a number of desired properties (operation 2206), with the process terminating thereafter.

Otherwise, if more than one medium are present, the process identifies the mediums and a number of transitions between the mediums (operation 2208). The process then identifies a number of characteristics for each of the identified mediums and for each of the number of transitions between the identified mediums (operation 2210). Thereafter, the process generates an optical signal with the identified mediums using the number of characteristics for each of the identified mediums and for each of the number of transitions and the location of the target such that the optical signal propagates through the identified mediums to the target with a number of desired properties (operation 2212) with the process terminating thereafter.

Figure 23:
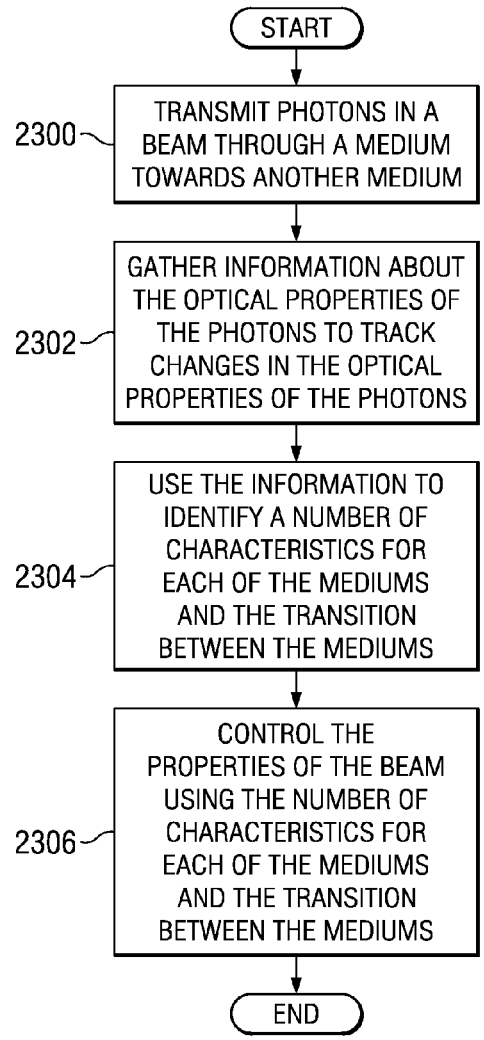
FIG. 23 is a flowchart of a process for tracking and controlling the transmission of photons in a beam in accordance with an advantageous embodiment.

With reference now to FIG. 23, a flowchart of a process for surface mapping is depicted in accordance with an advantageous embodiment. The process illustrated in FIG. 23 may be implemented using a wave front management system such as, for example, wave front management system 202 in FIG. 2.

The process begins by transmitting photons in a beam through a medium towards another medium (operation 2300). The process may then gather information about the optical properties of the photons to track changes in the optical properties of the photons (operation 2302). In these illustrative examples, operation 2302 may be performed using a number of different methods. Information may be gathered by detecting refraction, reflection, backscatter, and/or a holographic image of the photons as the photons propagate through the mediums. In these examples, refraction and/or reflection of the photons may be detected at the transition between the two mediums.

In some advantageous embodiments, operation 2302 may be performed by monitoring backscatter of the photons in the beam in the near-field, mid-field, and/or far-field. Backscatter is the reflection of photons back in the direction from which the photons originated.

In other advantageous embodiments, operation 2302 may be performed by monitoring holographic imaging of the characteristics of the photons at any range. In yet other advantageous embodiments, operation 2302 may be performed by monitoring the properties of the transmission of the photons at a receiver. Further, the receiver may also communicate with the transmitter to track these changes in the optical properties.

In still other advantageous embodiments, operation 2302 may be performed by monitoring the optical properties of the photons as the photons are reflected off of a remote object to track changes in the optical properties of the photons. In these illustrative examples, one or more of the methods described above may be used to perform operation 2302. The process may then use the information to identify a number of characteristics for each of the mediums and the transition between the mediums (operation 2304).

The process may then control the properties of the beam using the number of characteristics for each of the mediums and the transition between the mediums (operation 2306), with the process terminating thereafter. In other words, the wave front management system controls the transmission of the photons based on the characteristics of the medium and the transitions between the mediums. For example, the wave front management system uses surface mapping to reduce the number of directions in which the photons refract during transmission.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may be omitted or may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for managing a transmission of photons. In some advantageous embodiments, a number of parameters are identified for transmitting the photons as a beam in a liquid using a number of characteristics of the liquid to form a number of selected parameters. The photons are transmitted in the liquid as the beam to a target using the number of selected parameters. Of course, the different advantageous embodiments may be applied to other mediums and/or combinations of mediums.

One or more of the different advantageous embodiments described above provides a capability to adjust the transmission to take into account scattering and/or other changes that occur when the photons travel through a number of mediums to reach a target.

With one or more of the different advantageous embodiments, transmission of photons as optical signals, beams, and/or other suitable forms may be performed in a manner that has the transmission reach a target or destination with a number of desired properties at the target.

The description of the different advantageous embodiments has been presented for purposes of illustration and description, and it is not intended to be exhaustive or limited to the embodiments in the form disclosed.

Although the different advantageous embodiments have been described with respect to a submarine, the different advantageous embodiments also recognize that some advantageous embodiments may be applied to other types of platforms. For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, an aircraft, a bus, a personnel carrier, a tank, a train, an automobile, a spacecraft, a space station, a satellite, a planetary-probe, a surface ship, a power plant, a dam, a manufacturing facility, a building, and/or some other suitable object.

Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a transmission of photons, the method comprising:
    identifying a number of parameters for transmitting the photons as a beam in a liquid using a number of characteristics of the liquid to form a number of selected parameters; and
    transmitting the photons in the liquid as the beam to a target using the number of selected parameters to form the transmission of the photons, transmitting further including changing the number of characteristics of the liquid along a path for the beam using the number of selected parameters, and transmitting the beam along the path.

2. The method of claim 1, wherein the step of transmitting the photons in the liquid as the beam to the target using the number of selected parameters comprises:
    altering the transmission of the photons in the liquid from a number of current parameters to the number of selected parameters.

3. The method of claim 1, wherein the step of changing the number of characteristics of the liquid along the path for the beam using the number of selected parameters comprises:
    changing the number of characteristics of the liquid along the path for the beam using the number of selected parameters using an effector selected from at least one of an electromagnetic field, a laser, a radio frequency field, an x-ray, bubbles, a tube, heat, pressure, salinity, a waveguide, fiber-optics, ionizing particles, an energy force, and organic saturate absorbers.

4. The method of claim 1, wherein the step of transmitting the photons in the liquid as the beam to the target using the number of selected parameters further comprises:
    setting a number of properties for the beam.

5. The method of claim 4, wherein the step of setting the number of properties for the beam comprises:
    setting the number of properties for the beam in which the number of properties for the beam is selected from at least one of a direction, focus, power, tilt, tilt angle, phase, wavelength, amplitude, aperture size, and wave front.

6. The method of claim 1, wherein the step of identifying the number of parameters for transmitting the photons as the beam in the liquid using the number of characteristics comprises:
    identifying the number of parameters for transmitting the photons as the beam in the liquid using the number of characteristics in which the number of characteristics for the liquid is selected from at least one of pressure, salinity, temperature, presence of aquatic life, presence of entrained air, depth, and flow patterns.

7. The method of claim 1 further comprising:
    transmitting initial photons in the liquid as an initial beam to the target to form an initial transmission; and
    identifying the number of characteristics of the liquid in response to the initial transmission.

8. The method of claim 7, wherein the step of identifying the number of characteristics of the liquid in response to the transmission comprises:
    detecting at least one of a refraction, a reflection, a backscatter, and a holographic image of the photons in the beam to form a response; and
    identifying the number of characteristics of the liquid from the response.

9. The method of claim 8, wherein the step of detecting at least one of the refraction, the reflection, the backscatter, and the holographic image of the photons in the beam to form the response comprises:
    detecting at least one of the refraction, the reflection, the backscatter, and the holographic image of the photons in the beam to form the response in which the refraction and the reflection are in response to the photons in the beam encountering a transition between the liquid and air.

10. The method of claim 9, wherein the step of detecting at least one of the refraction, the reflection, the backscatter, and the holographic image of the photons in the beam to form the response comprises:
    detecting at least one of the refraction, the reflection, the backscatter, and the holographic image of the photons in the beam to form the response in which the refraction and the reflection are in response to the photons in the beam encountering the transition between the liquid and air, wherein the transition comprises at least one of a surface, a wave, an edge, and a boundary.

11. The method of claim 1, wherein the step of transmitting the photons in the liquid as the beam to the target using the number of selected parameters to form the transmission of the photons comprises:
    transmitting the photons in the liquid as the beam to the target using the number of selected parameters to form the transmission of the photons, wherein the liquid is water in an ocean.

12. The method of claim 1, wherein the step of transmitting the photons in the liquid as the beam to the target using the number of selected parameters to form the transmission of the photons comprises:
    transmitting the photons in the liquid as the beam to the target using the number of selected parameters to form the transmission of the photons, wherein the beam is transmitted continuously while altering the transmission of the photons in the liquid from a number of current parameters to the number of selected parameters.

13. The method of claim 1, wherein the step of transmitting the photons in the liquid as the beam to the target using the number of selected parameters to form the transmission of the photons comprises:
    transmitting the photons in the liquid as the beam to the target using the number of selected parameters to form the transmission of the photons, wherein the beam is transmitted in a pulsed or modulated manner while altering the transmission of the photons in the liquid from a number of current parameters to the number of selected parameters.

14. The method of claim 1, wherein the step of transmitting the photons in the liquid as the beam to the target using the number of selected parameters to form the transmission of the photons comprises:
    transmitting the photons in the liquid as the beam to the target using the number of selected parameters to form the transmission of the photons, wherein the beam is used for one of communications, ranging, surveillance, target illumination, and damaging the target.

15. The method of claim 1, wherein the step of transmitting the photons in the liquid as the beam to the target using the number of selected parameters to form the transmission of the photons comprises:
    transmitting the photons in the liquid as the beam to the target using the number of selected parameters to form the transmission of the photons, wherein the beam travels through the liquid into a medium selected from one of a second liquid, a solid, an atmosphere, and outer space, wherein the target is located in the medium.

16. The method of claim 15, wherein the step of transmitting the photons in the liquid as the beam to the target using the number of selected parameters to form the transmission of the photons comprises:
    transmitting the photons in the liquid as the beam to the target using the number of selected parameters to form the transmission of the photons, wherein the beam travels through the liquid into a number of mediums between the liquid and the medium.

17. A method for managing a transmission of optical signals, the method comprising:

identifying a first number of characteristics for a first medium;

identifying a second number of characteristics for a second medium;

identifying a third number of characteristics for a transition between the first medium and the second medium;

identifying a location of a target in the second medium; and generating an optical signal within the first medium using the first number of characteristics, the second number of characteristics, the third number of characteristics, and the location of the target, wherein the optical signal propagates through the first medium, the transition, and the second medium reaching the target with a number of desired properties at the target.

18. The method of claim 17, wherein the step of generating the optical signal within the first medium using the first number of characteristics, the second number of characteristics, the third number of characteristics, and the location of the target, wherein the optical signal propagates through the first medium, the transition, and the second medium reaching the target with the number of desired properties at the target comprises:

generating an optical signal within the first medium using the first number of characteristics, the second number of characteristics, the third number of characteristics, and the location of the target, wherein the optical signal propagates through the first medium, the transition, and the second medium reaching the target with the number of desired properties at the target, wherein the number of desired properties for the optical signal is selected from at least one of a wavelength, an amplitude, and a wave front.

19. The method of claim 17, wherein the step of identifying the third number of characteristics for the transition between the first medium and the second medium comprises:

identifying the third number of characteristics for the transition between the first medium and the second medium, wherein the first medium is water and the second medium is selected from one of an atmosphere and outer space.

20. The method of claim 17, wherein the step of generating the optical signal within the first medium using the first number of characteristics, the second number of characteristics, the third number of characteristics, and the location of the target, wherein the optical signal propagates through the first medium, the transition, and the second medium reaching the target with the number of desired properties at the target comprises:

generating the optical signal within the first medium using the first number of characteristics, the second number of characteristics, the third number of characteristics, and the location of the target, wherein the optical signal propagates through the first medium, the transition, and the second medium reaching the target with the number of desired properties at the target, wherein a propagation of the optical signal through the transition changes a focus of the optical signal such that a number of properties of the optical signal changes to the number of desired properties when the optical signal reaches the target.

21. The method of claim 17, wherein the step of generating the optical signal within the first medium using the first number of characteristics, the second number of characteristics, the third number of characteristics, and the location of the target, wherein the optical signal propagates through the first medium, the transition, and the second medium reaching the target with the number of desired properties at the target comprises:

changing a number of characteristics of a portion of the first medium taking into account at least one of the first number of characteristics, the second number of characteristics, and the third number of characteristics to form a modified portion of the first medium; and transmitting the optical signal in the first medium through the modified portion of the first medium in a path to reach the target, wherein the first medium changes a number of properties of the optical signal such that the optical signal reaches the target in the second medium with the number of desired properties.

22. An apparatus comprising:

a photon generation system configured to generate photons;

a wave front management system configured to control a number of properties of the photons generated by the photon generation system, wherein the photon generation system is associated with the wave front management system; and a sensor capable of detecting a number of characteristics of a number of mediums through which the photons in the beam travel.

23. The apparatus of claim 22, wherein the wave front management system is configured to change the number of properties of the photons generated by the photon generation system.

24. The apparatus of claim 23, wherein the wave front management system further comprises:

an optical system, wherein the optical system is configured to focus the photons in a beam.

25. The apparatus of claim 22, wherein the photon generation system comprises at least one of a system of lasers, a system of deformable minors, and a system of lenses.

26. The apparatus of claim 22, wherein the wave front management system controls a number of wave fronts for the photons.

27. The apparatus of claim 22, wherein the wave front management system is configured to identify a number of parameters for transmitting the photons as a beam in a liquid using a number of characteristics of the liquid to form a number of selected parameters and transmit the photons in the liquid as the beam to a target using the number of selected parameters.

28. The apparatus of claim 27, wherein the wave front management system is configured to alter the transmission of the photons in the liquid from a number of current parameters to the number of selected parameters.

29. The apparatus of claim 28, wherein the wave front management system is configured to change the number of characteristics of the liquid along the path for the beam using the number of selected parameters using an effector selected from at least one of an electromagnetic field, a laser, a radio frequency field, an x-ray, bubbles, a tube, heat, pressure, salinity, a waveguide, fiber-optics, ionizing particles, an energy force, and organic saturate absorbers.

30. The apparatus of claim 27, wherein the wave front management system is configured to change the number of characteristics of the liquid along a path for the beam using the number of selected parameters; and transmit the beam along the path.

31. The apparatus of claim 27, wherein the wave front management system is configured to set a number of properties for the beam.

32. The apparatus of claim 31, wherein the number of properties for the beam is selected from at least one of a direction, focus, power, tilt, tilt angle, phase, wavelength, amplitude, aperture size, and wave front.

33. The apparatus of claim 27, wherein the number of characteristics of the liquid is selected from at least one of pressure, temperature, salinity, presence of aquatic life, presence of entrained air, depth, and flow patterns.

34. The apparatus of claim 27, wherein the wave front management system is configured to transmit the photons in the liquid as the beam to the target to form a transmission; and identify the number of characteristics of the liquid in response to the transmission.

35. The apparatus of claim 27, wherein the wave front management system is configured to detect at least one of a refraction, a reflection, a backscatter, and a holographic image of the photons in the beam to form a response; and identify the number of characteristics of the liquid from the response.

36. The apparatus of claim 35, wherein the refraction and the reflection are in response to the photons in the beam encountering a transition between one of the liquid and an atmosphere and the liquid and outer space, wherein the transition comprises at least one of a surface, a wave, an edge, and a boundary for the liquid.

37. The apparatus of claim 27, wherein the beam is transmitted continuously while altering a transmission of the photons in the liquid from a number of current parameters to the number of selected parameters.

38. The apparatus of claim 27, wherein the beam is transmitted in a pulsed or modulated manner while altering a transmission of the photons in the environment from a number of current parameters to the number of selected parameters.

39. The apparatus of claim 27, wherein the beam is used for one of communications, ranging, surveillance, target illumination, and damaging the target.

40. The apparatus of claim 27, wherein the beam travels through the liquid into a number of mediums selected from at least one of a second liquid, a solid, an atmosphere, and outer space, wherein the target is located in one of the number of mediums.

41. The apparatus of claim 22, wherein the wave front management system is further configured to identify a first number of characteristics for a first medium, a second number of characteristics for a second medium, a third number of characteristics for a transition between the first medium and the second medium, and a location of a target in the second medium; and generate an optical signal comprising the photons within the first medium using the first number of characteristics, the second number of characteristics, the third number of characteristics, and the location of the target, wherein the optical signal propagates through the first medium, the transition, and the second medium reaching the target with a number of desired properties at the target.

42. The apparatus of claim 41, wherein the wave front management system is configured to change a number of characteristics of a portion of the first medium taking into account at least one of the first number of characteristics, the second number of characteristics, and the third number of characteristics to form a modified portion of the first medium; and transmit the optical signal in the first medium through the modified portion of the first medium in a path to reach the target, wherein the first medium changes a number of properties of the optical signal such that the optical signal reaches the target in the second medium with the number of desired properties.

43. The apparatus of claim 41, wherein the number of properties for the optical signal is selected from at least one of a wavelength, an amplitude, and a wave front.

44. The apparatus of claim 41, wherein a propagation of the optical signal through the transition changes a focus of the optical signal such that a number of properties of the optical signal changes to the number of desired properties when the optical signal reaches the target.

45. The apparatus of claim 22, wherein the wave front management system is configured to identify a number of parameters for transmitting the photons as a beam in a medium using a number of characteristics of the medium to form a number of selected parameters; and transmit the photons in the medium as the beam to a target using the number of selected parameters.

46. The apparatus of claim 45, wherein the medium is selected from one of a liquid, a solid, a gas, a vapor, air, and space.

47. The apparatus of claim 22 further comprising:
a platform, wherein the photon generation system and the wave front management system are associated with the platform, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a planetary-probe, a submarine, an automobile, a power plant, a bridge, a dam, a manufacturing facility, and a building.

48. A method for managing a transmission of photons, the method comprising:
identifying a number of parameters for transmitting the photons as a beam in a medium using a number of characteristics of the medium to form a number of selected parameters; and
transmitting the photons in the medium as the beam to a target using the number of selected parameters, transmitting further including changing the number of characteristics of the medium along a path for the beam using the number of selected parameters, and transmitting the beam along the path.

49. The method of claim 48,
wherein the medium is selected from one of a liquid, a solid, a gas, a vapor, air, and space.

* * * * *